United States Patent
Pretorius

(10) Patent No.: US 9,964,760 B2
(45) Date of Patent: May 8, 2018

(54) LENS AND OPTICAL OBSERVATION DEVICE

(71) Applicant: Carl Zeiss Microscopy GmbH, Jena (DE)

(72) Inventor: Marco Pretorius, Oberkochen (DE)

(73) Assignee: Carl Zeiss Microscopy GMBH, Jena (DE)

(*) Notice: Subject to any disclaimer, the term of this patent is extended or adjusted under 35 U.S.C. 154(b) by 160 days.

(21) Appl. No.: 14/769,109

(22) PCT Filed: Feb. 18, 2014

(86) PCT No.: PCT/EP2014/053122
§ 371 (c)(1),
(2) Date: Feb. 1, 2016

(87) PCT Pub. No.: WO2014/128119
PCT Pub. Date: Aug. 28, 2014

(65) Prior Publication Data
US 2016/0131900 A1    May 12, 2016

(30) Foreign Application Priority Data
Feb. 21, 2013   (DE) .................. 10 2013 101 711

(51) Int. Cl.
*G02B 27/00* (2006.01)
*G02B 5/00* (2006.01)
(Continued)

(52) U.S. Cl.
CPC ......... *G02B 27/0068* (2013.01); *G02B 5/005* (2013.01); *G02B 13/0095* (2013.01);
(Continued)

(58) Field of Classification Search
CPC ............ G02B 27/0025; G02B 27/0037; G02B 27/0056; G02B 27/0068; G02B 27/30;
(Continued)

(56) References Cited

U.S. PATENT DOCUMENTS

| 3,305,298 A | 2/1967 | Chapman et al. |
| 4,457,592 A | 7/1984 | Baker |

(Continued)

FOREIGN PATENT DOCUMENTS

| DE | 10 2012 101 262 B3 | 4/2013 |
| EP | 1 486 160 A2 | 12/2004 |

(Continued)

OTHER PUBLICATIONS

Hellmuth, T., et al. "Variable phaseplates for focus invariant optical systems." Optical Systems Design 2005. International Society for Optics and Photonics, 2005.

(Continued)

*Primary Examiner* — Stephone B Allen
*Assistant Examiner* — Adam W Booher
(74) *Attorney, Agent, or Firm* — Nixon Peabody LLP; Jeffrey L. Costellia

(57) ABSTRACT

The invention relates to a lens (1), comprising a first lens unit (3), at least one second lens unit (5), and at least one pupil (7) having a pupil radius. The first lens unit (3) and the second lens unit (5) are arranged at a distance from each other along an optical axis (OA) of the objective, such that an intermediate space is present between the first lens unit (3) and the second lens unit (5). The second lens unit (5) is arranged on the image side with respect to the first lens unit (3). The first lens unit (3) is designed in such a way that the first lens unit produces a collimated beam.

20 Claims, 19 Drawing Sheets

(51) Int. Cl.
*G02B 13/00* (2006.01)
*G02B 13/18* (2006.01)
*G02B 13/22* (2006.01)
*G02B 21/02* (2006.01)
*G02B 21/33* (2006.01)
*G02B 27/30* (2006.01)

(52) U.S. Cl.
CPC .............. *G02B 13/18* (2013.01); *G02B 13/22* (2013.01); *G02B 21/02* (2013.01); *G02B 21/33* (2013.01); *G02B 27/0037* (2013.01); *G02B 27/30* (2013.01)

(58) Field of Classification Search
CPC ........................... G02B 27/42; G02B 27/4272; G02B 27/4277; G02B 5/005; G02B 5/18; G02B 5/1814; G02B 5/1866; G02B 5/1871; G02B 13/0095; G02B 13/18; G02B 13/20; G02B 13/22; G02B 21/02; G02B 21/33; G02B 21/36; G02B 21/361; G02B 26/06; G02B 2005/1804; G01J 9/00
See application file for complete search history.

(56) References Cited

U.S. PATENT DOCUMENTS

| | | |
|---|---|---|
| 6,751,175 B1 | 6/2004 | Maeda et al. |
| 7,841,715 B1 | 11/2010 | Morrison |
| 2007/0247725 A1 | 10/2007 | Dowski, Jr. et al. |
| 2008/0143984 A1* | 6/2008 | Holderer ................ G02B 17/08 355/53 |
| 2010/0265478 A1 | 10/2010 | Beierl et al. |
| 2011/0292516 A1 | 12/2011 | Ojeda Castaneda et al. |

FOREIGN PATENT DOCUMENTS

| | | |
|---|---|---|
| JP | 2013-34127 | 2/2013 |
| WO | WO 2012-025349 A1 | 3/2012 |
| WO | WO 2013/120800 A1 | 8/2013 |

OTHER PUBLICATIONS

D. Ehrt et al., "Optische Gläser mit anomaler Teildispersion", Feingerätetechnik 31 (1982), No. 4, Apr. 1, 1982, pp. 147-151.
International Search Report for PCT/EP2014/053122 dated Apr. 17, 2014.

* cited by examiner

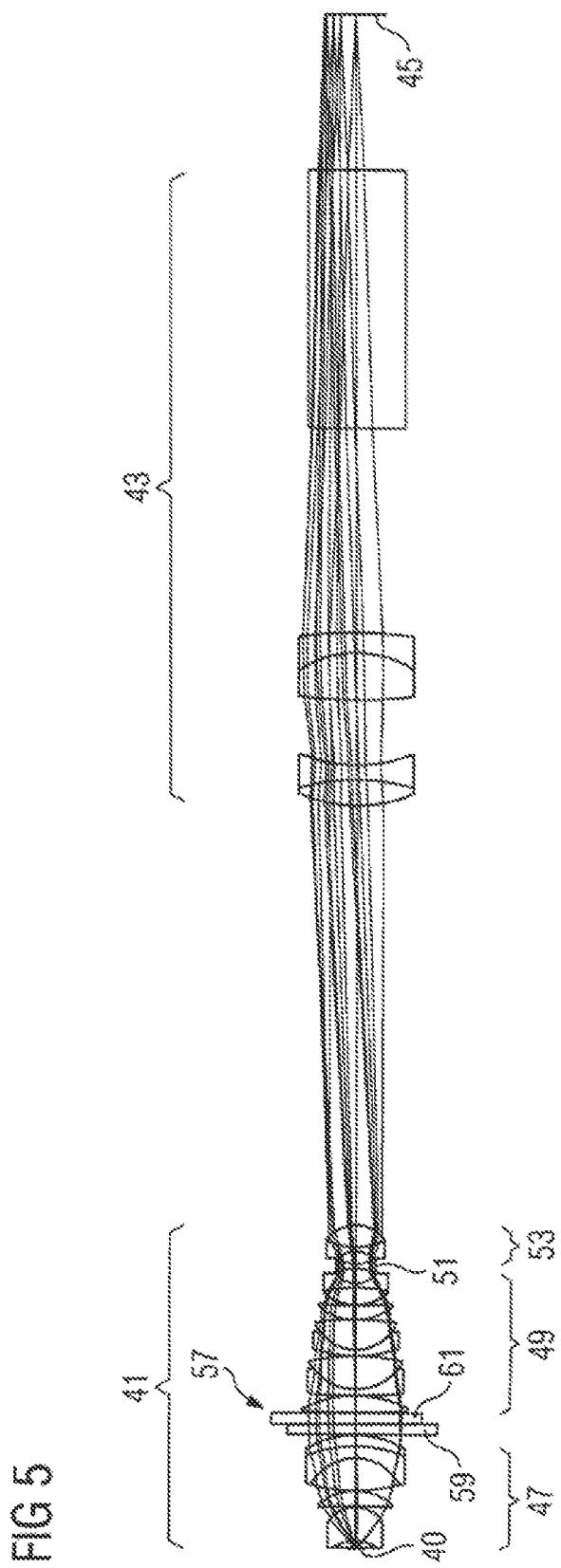

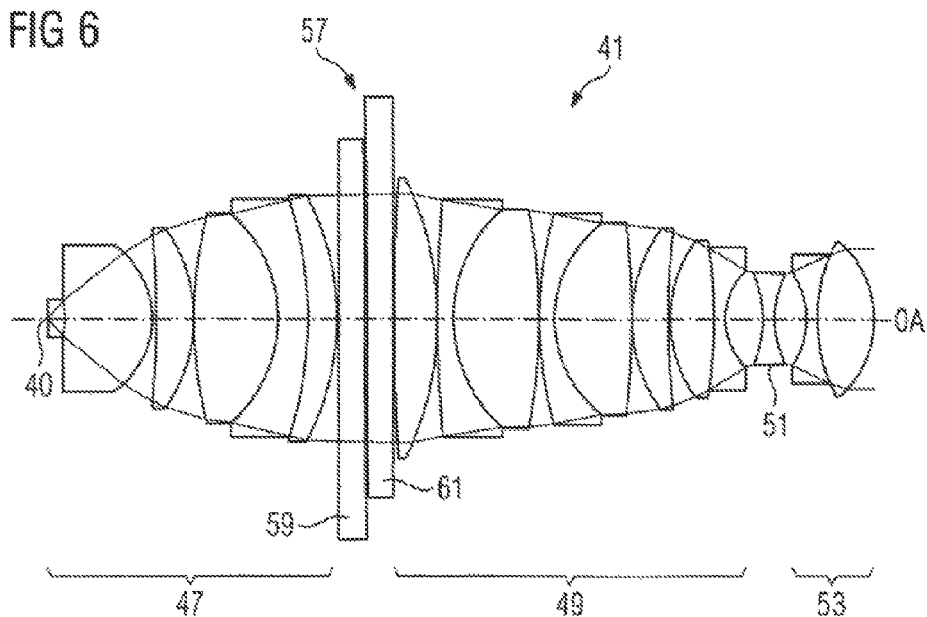
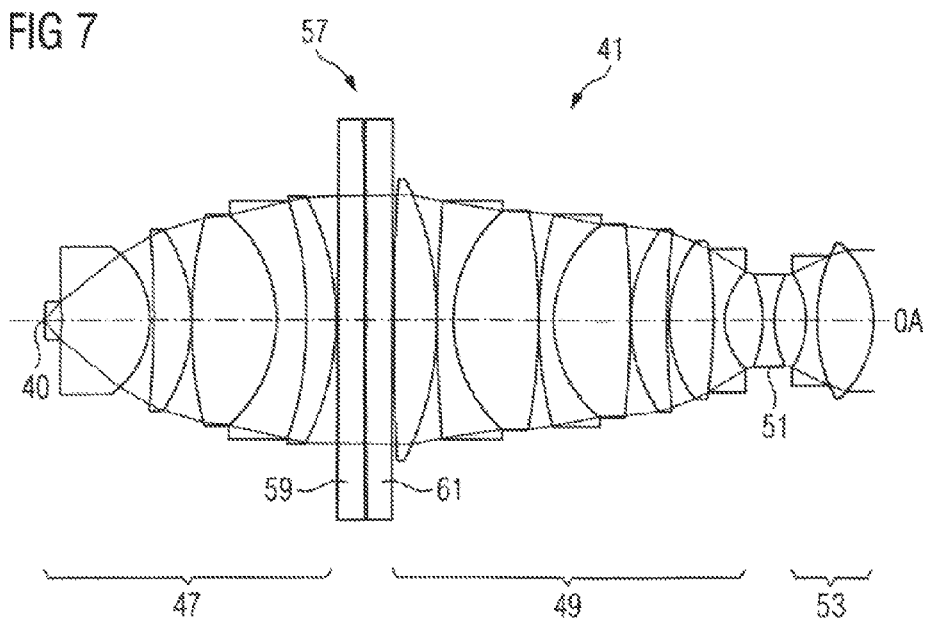

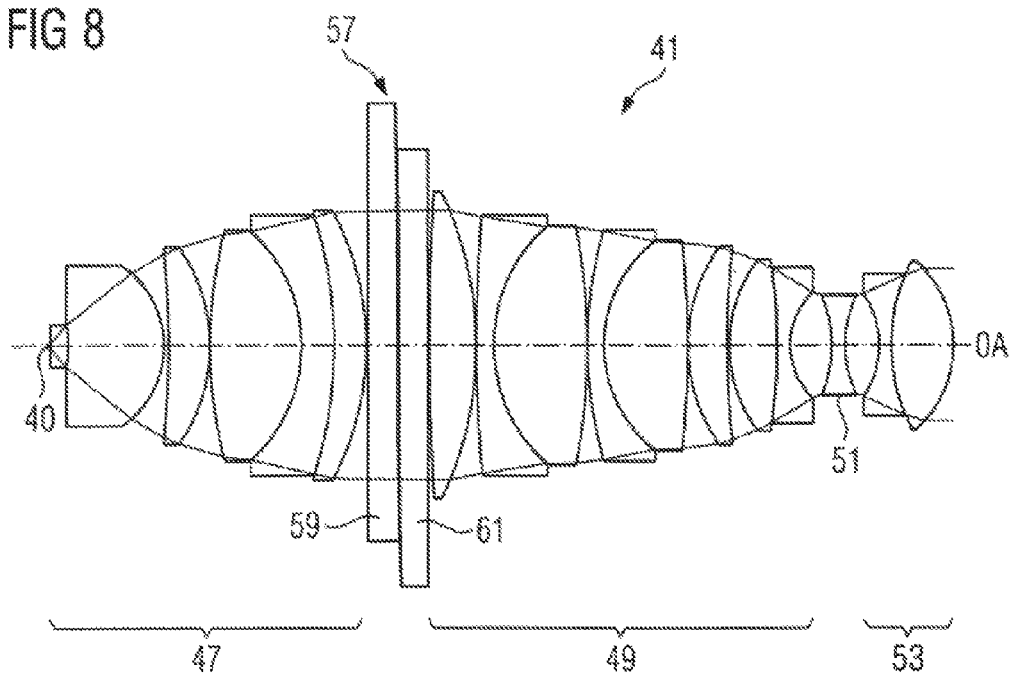

FIG 9

| Surface # | Surface Type | Y Radius | Thickness | Glass | Y Semi-Aperture | Non-Center Data |
|---|---|---|---|---|---|---|
| Object | Sphere | Infinity | -0.1000 | NACL0923 | | |
| 1 | Sphere | Infinity | 0.0000 | NACL0923 | 0.6020 | |
| 2 | Sphere | Infinity | 0.1700 | NK5_SCHOTT | 0.6020 | |
| 3 | Sphere | Infinity | 2.0000 V | NACL0923 | 0.7383 | |
| 4 | Sphere | -12.7846 V | 10.5469 V | SYGH51_OHARA | 2.5217 | |
| 5 | Sphere | -10.5322 V | 0.5000 V | | 7.9009 | |
| 6 | Sphere | -105.2074 V | 4.6902 V | SFPL53_OHARA | 9.9674 | |
| 7 | Sphere | -18.4792 V | 0.0200 | | 10.6559 | |
| 8 | Sphere | 51.0132 V | 16.1326 V | SFPL53_OHARA | 12.1058 | |
| 9 | Sphere | -16.5622 V | 3.6598 V | NKZFS11_SCHOTT | 12.4673 | |
| 10 | Sphere | -44.3032 V | 3.5403 V | SNBH53_OHARA | 14.0756 | |
| 11 | Sphere | -39.7817 V | 0.2000 | | 14.5824 | |
| 12 | Sphere | Infinity | 0.0000 | | 17.1668 | Basic Decenter |
| 13 | Sphere | Infinity | 3.2000 V | NLASF44_SCHOTT | 17.1668 | |
| 14 | XY Polynom | Infinity | 0.0000 | | 17.2163 | |
| 15 | Sphere | Infinity | 0.0000 | | 14.7232 | Basic Decenter |
| 16 | Sphere | Infinity | 0.2000 | | 14.7232 | |
| 17 | Sphere | Infinity | 0.0000 | | 17.2211 | Basic Decenter |
| 18 | XY Polynom | Infinity | 3.2000 V | NLASF44_SCHOTT | 17.2243 | |
| 19 | Sphere | Infinity | 0.0000 | | 17.2645 | |
| 20 | Sphere | Infinity | 0.0000 | | 14.7701 | Basic Decenter |
| 21 | Sphere | Infinity | 0.2000 | | 14.7701 | |
| Stop | Sphere | 301.6364 V | 5.1476 V | SFPL53_OHARA | 15.5000 | |
| 23 | Sphere | -38.1516 V | 0.0200 | | 14.7855 | |
| 24 | Sphere | 159.7166 V | 2.0000 V | NKZFS11_SCHOTT | 14.0806 | |
| 25 | Sphere | 17.2069 V | 10.3893 V | SFPL53_OHARA | 12.8703 | |
| 26 | Sphere | -66.3956 V | 0.0200 V | | 12.8868 | |
| 27 | Sphere | 44.9540 V | 1.8500 V | NKZFS11_SCHOTT | 12.4989 | |
| 28 | Sphere | 14.2665 V | 9.3031 V | SFPL53_OHARA | 11.4049 | |
| 29 | Sphere | -105.3291 V | 0.0200 V | | 11.2518 | |
| 30 | Sphere | 18.5276 V | 4.4021 V | SFPL53_OHARA | 10.7560 | |
| 31 | Sphere | 98.5097 V | 0.2500 V | | 10.3221 | |
| 32 | Sphere | 15.6150 V | 5.1880 V | SNBH53_OHARA | 9.2946 | |
| 33 | Sphere | -63.5472 V | 1.4000 V | NSK2_SCHOTT | 8.4588 | |
| 34 | Sphere | 7.8470 V | 4.6042 V | | 5.7913 | |
| 35 | Sphere | -14.0669 V | 1.4500 V | NKZFS11_SCHOTT | 5.4615 | |
| 36 | Sphere | 12.0159 V | 3.7866 V | | 5.3538 | |
| 37 | Sphere | -9.9712 V | 1.4000 V | NKZFS11_SCHOTT | 5.6059 | |
| 38 | Sphere | 26.5377 V | 6.6901 V | SYGH51_OHARA | 7.6663 | |
| 39 | Sphere | -12.2423 V | 0.0200 | | 8.3700 | |
| 40 | Sphere | Infinity | 130.0000 | | 8.5096 | |
| 41 | Sphere | 45.6448 | 8.0000 | NBAK4_SCHOTT | 17.0000 | |
| 42 | Sphere | -67.3134 | 4.5000 | NSF1_SCHOTT | 14.5308 | |
| 43 | Sphere | 45.3160 | 20.2000 | | 17.0000 | |
| 44 | Sphere | 143.2627 | 14.6000 | SFTM16_OHARA | 17.0000 | |
| 45 | Sphere | -34.2268 | 8.3000 | NBK7_SCHOTT | 16.8866 | |
| 46 | Sphere | -137.2633 | 63.3600 | | 17.0000 | |
| 47 | Sphere | Infinity | 80.0000 | NBK7_SCHOTT | 14.2785 | |
| 48 | Sphere | Infinity | 48.2000 | | 12.0542 | |
| Image | Sphere | Infinity | 0.0000 | | 10.0178 | |

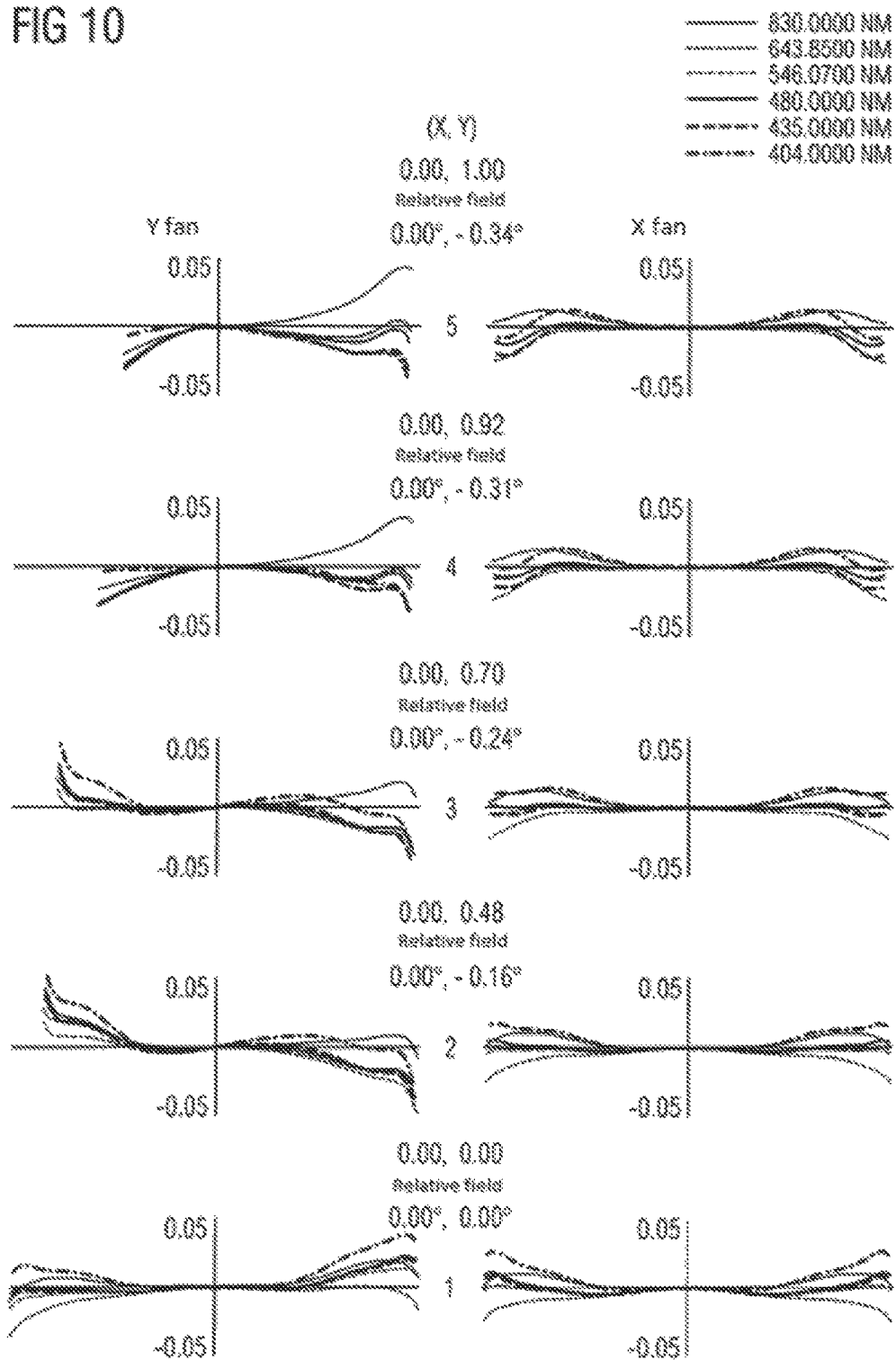

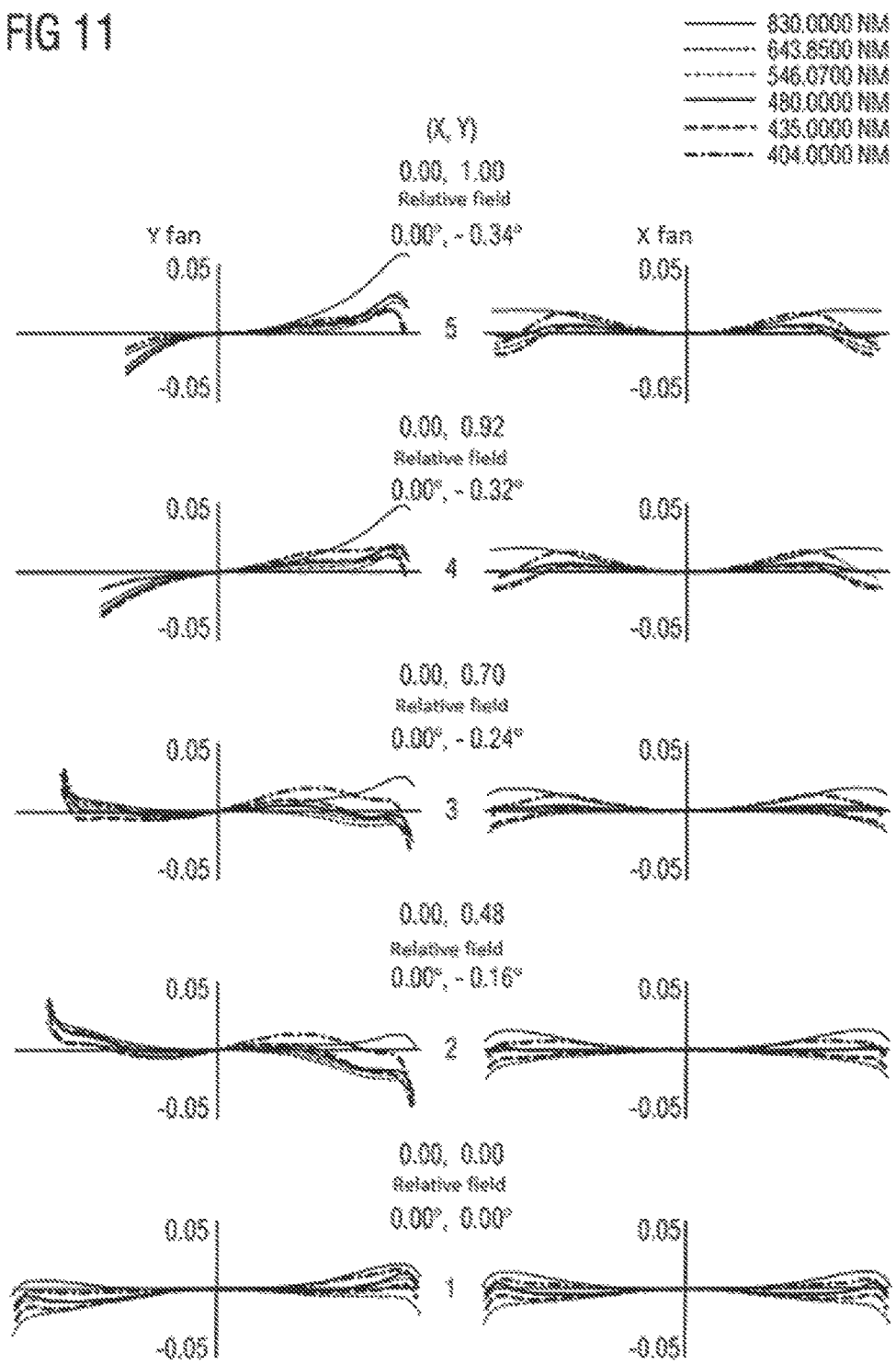

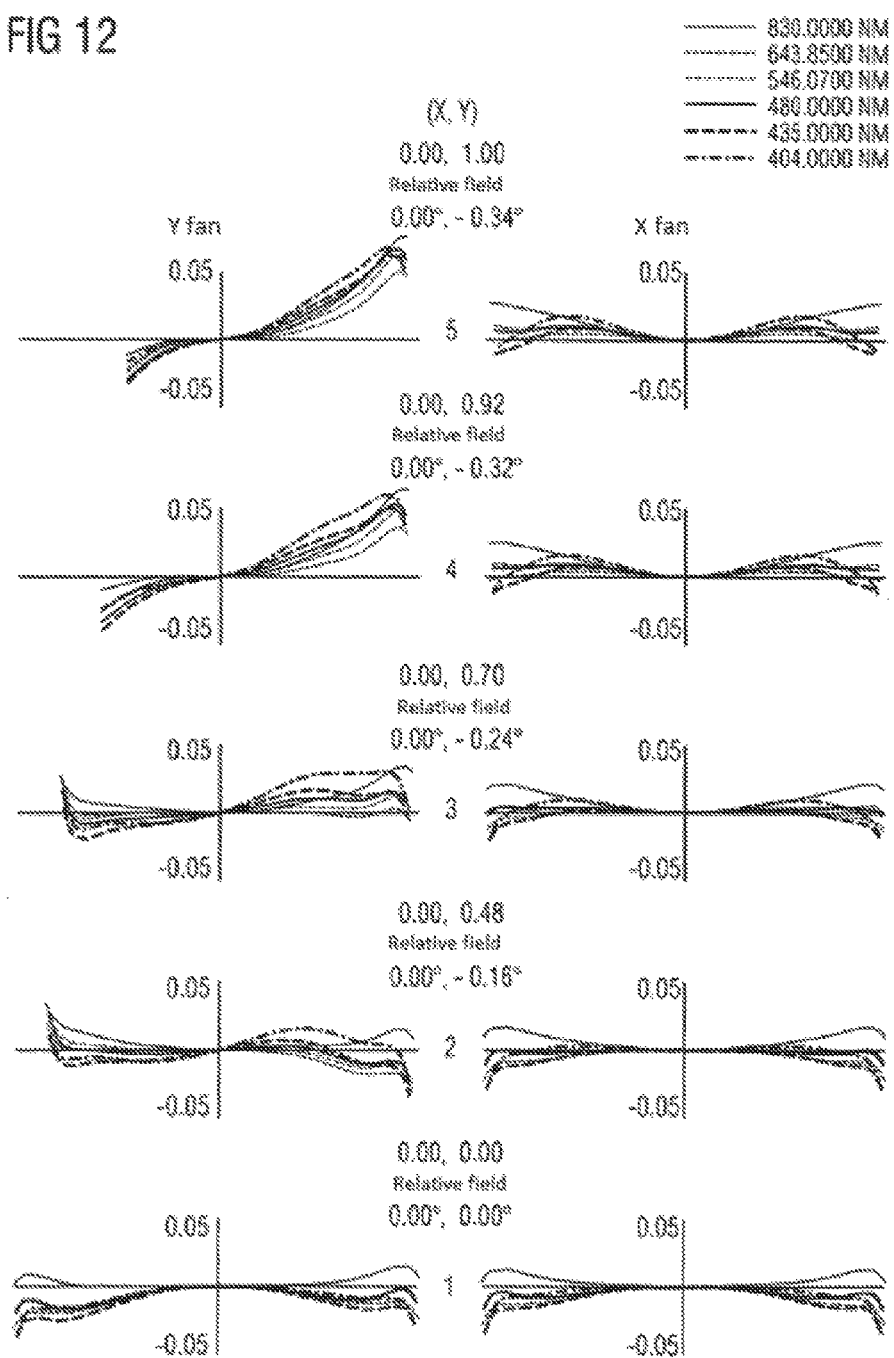

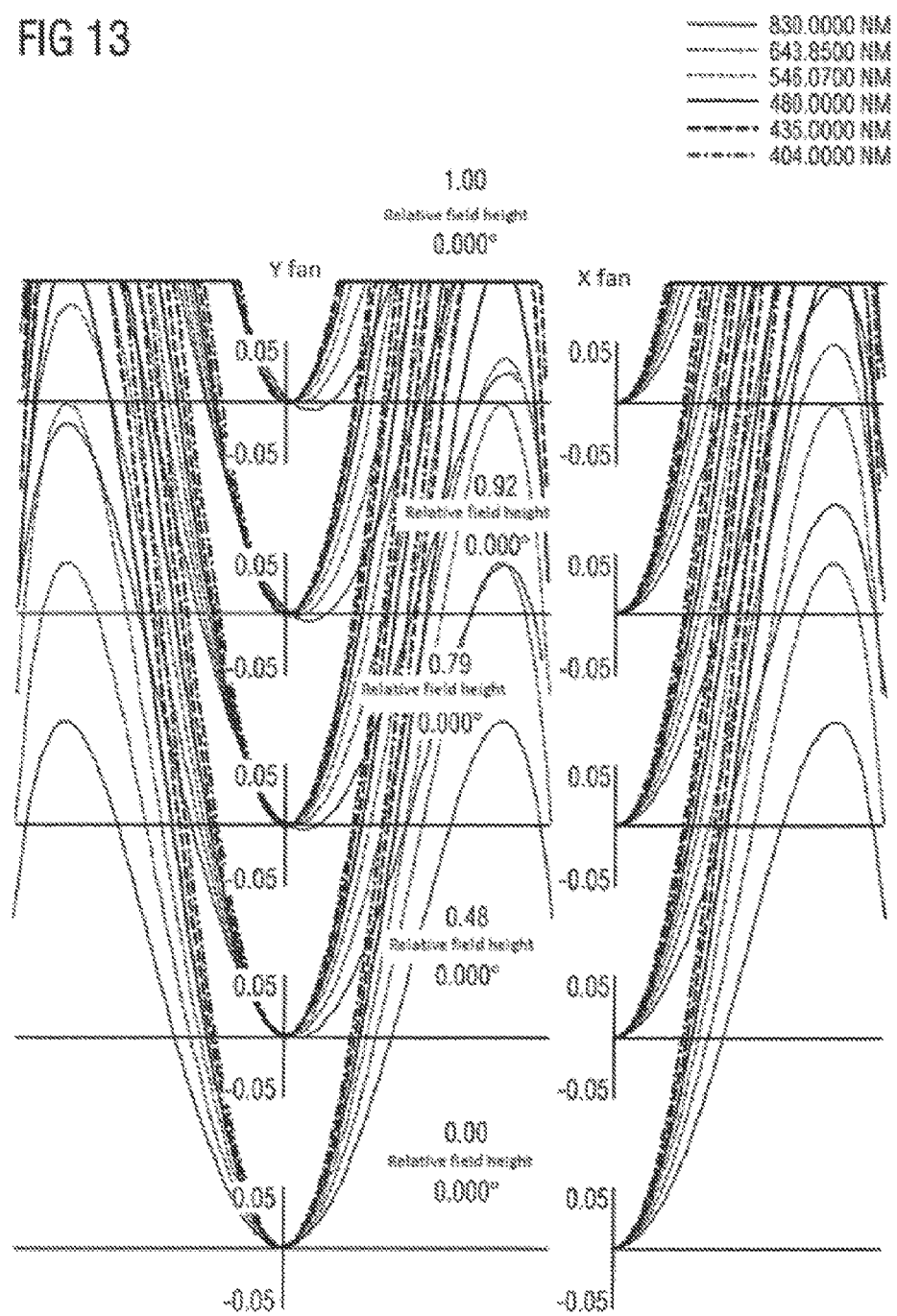

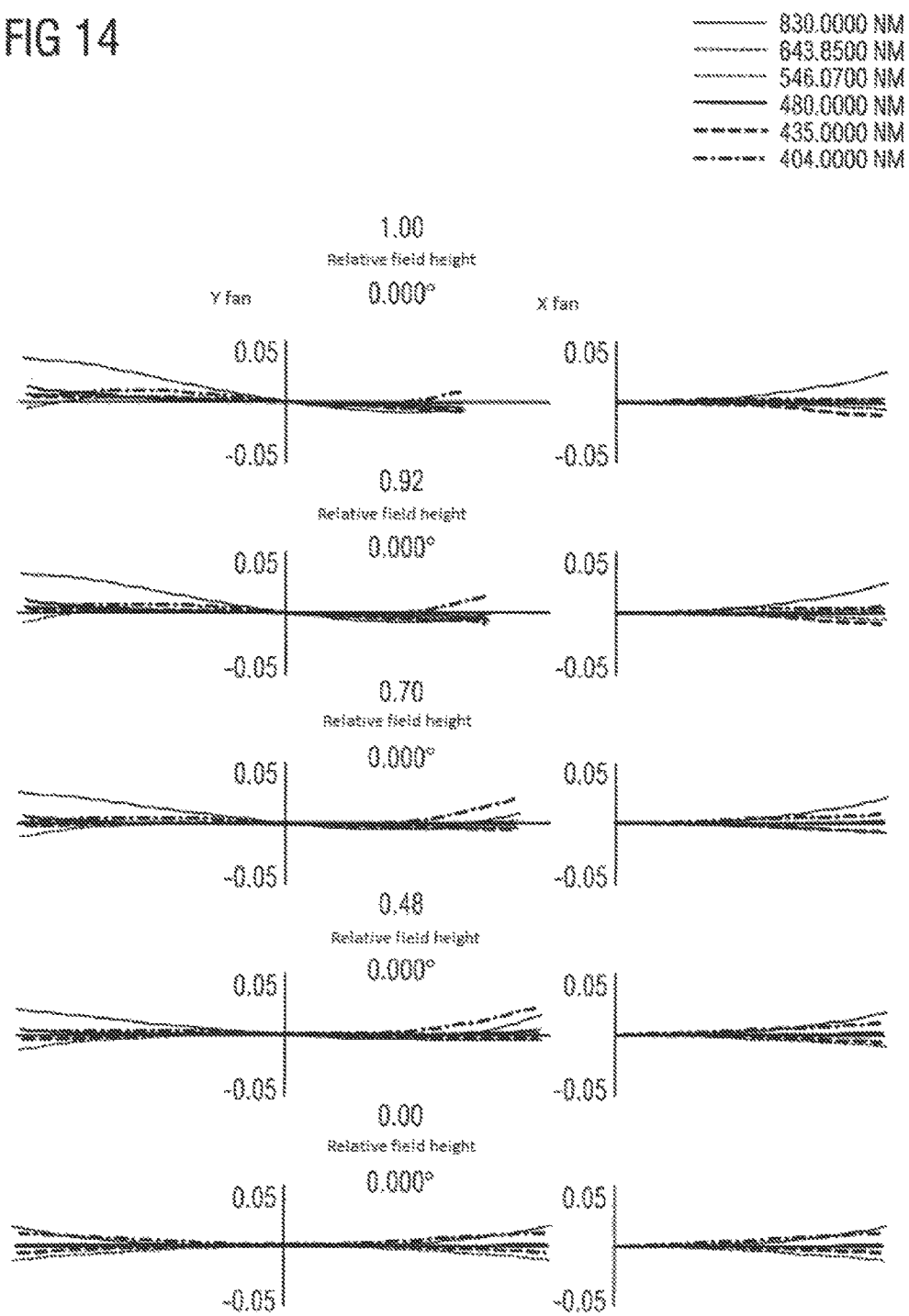

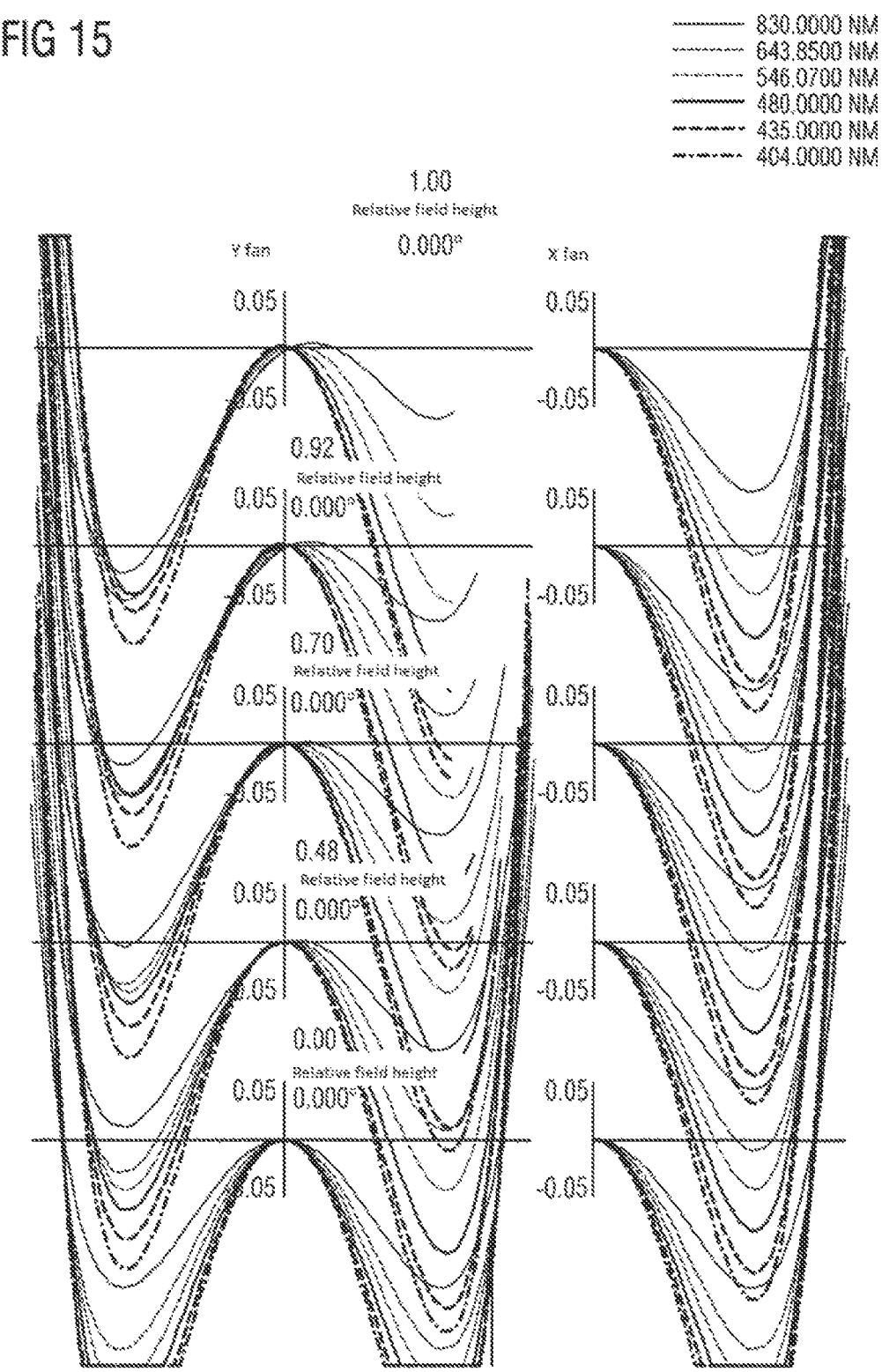

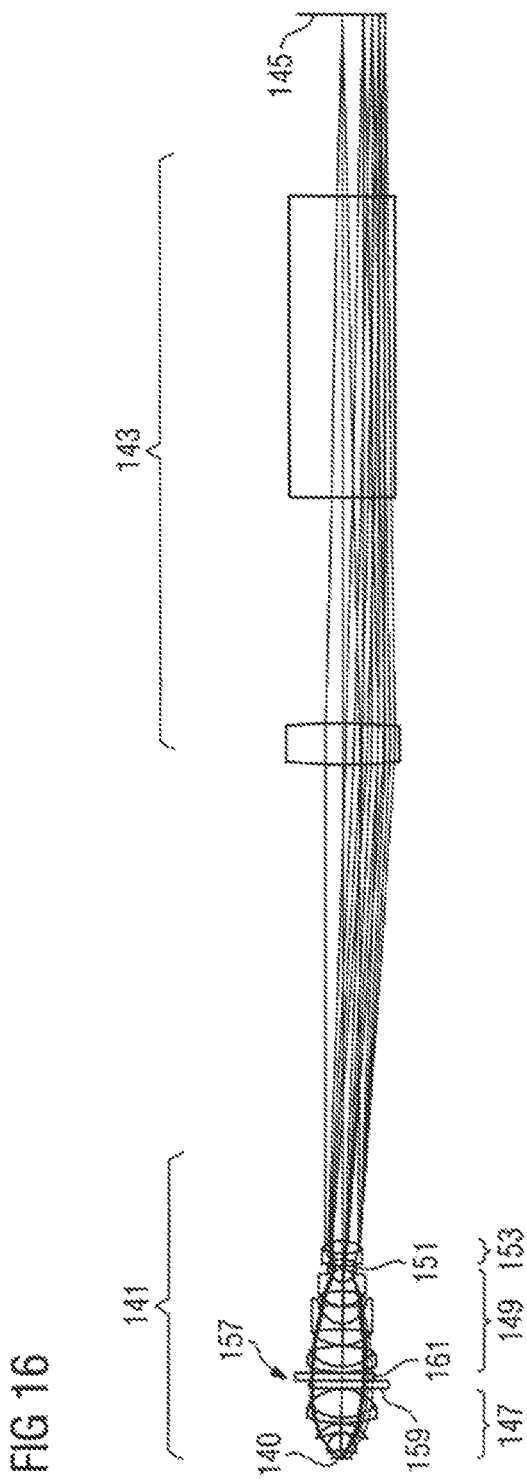

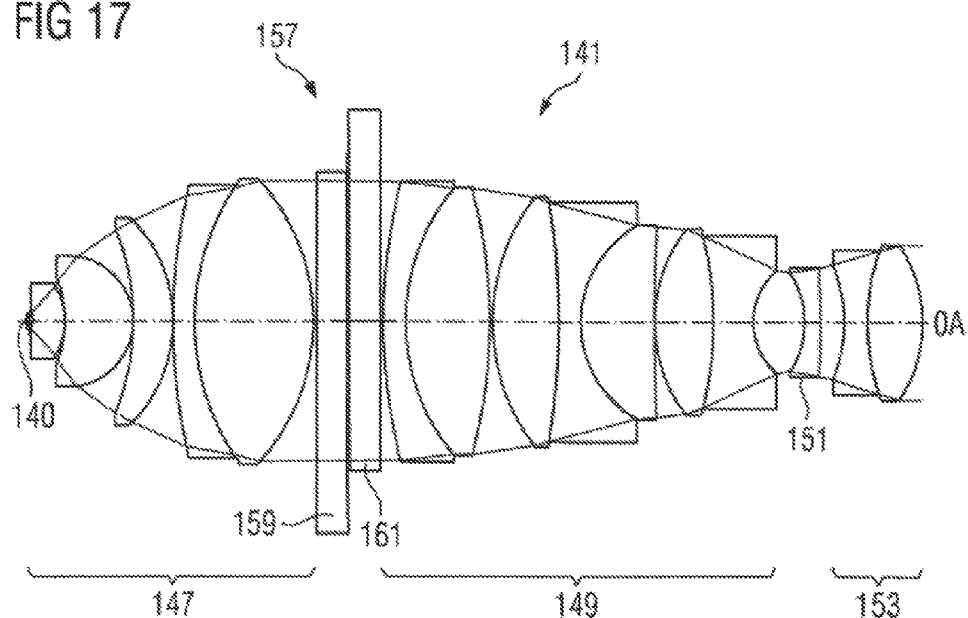
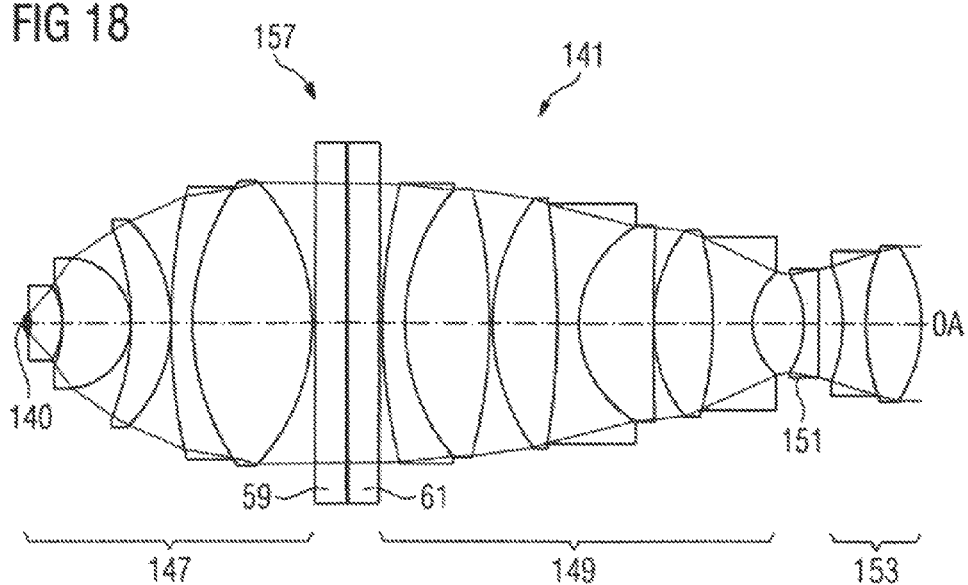

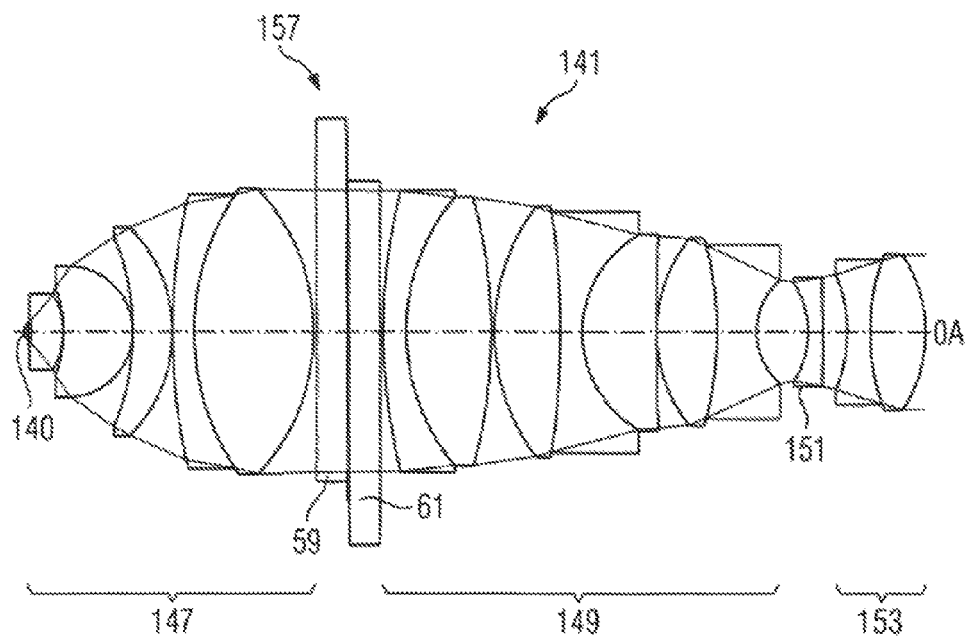

FIG 20

| Surface # | Surface Name | Surface Type | Y Radius | Thickness | Glass | Refract Mode | Y Semi-Aperture | Non-Center Data |
|---|---|---|---|---|---|---|---|---|
| Object | | Sphere | Infinity | 0.0319 ² | W2² | Refract | | |
| 1 | | Sphere | Infinity | 0.1700 | K5_SCHOT | Refract | 0.4456 ° | |
| 2 | | Sphere | Infinity | 0.2000 | W2² | Refract | 0.5817 ° | |
| 3 | | Asphere | -2.2006 ᵛ | 2.0245 ᵛ | SLAH58_0 | Refract | 0.6700 ° | |
| 4 | | Asphere | -4.3327 ᵛ | 0.0200 ᵛ | | Refract | 2.3557 ° | |
| 5 | | Sphere | -7.4463 ᵛ | 4.4368 ᵛ | SFPL53_0 | Refract | 2.7939 ° | |
| 6 | | Sphere | -4.1441 ᵛ | 0.0200 ᵛ | | Refract | 4.1408 ° | |
| 7 | | Sphere | -15.5167 ᵛ | 2.5475 ᵛ | SFPL53_0 | Refract | 5.9685 ° | |
| 8 | | Sphere | -9.2285 ᵛ | 0.0200 ᵛ | | Refract | 6.5697 ° | |
| 9 | | Sphere | 36.7181 ᵛ | 1.4000 ᵛ | NKZFS2_S | Refract | 8.1417 ° | |
| 10 | | Sphere | 15.6209 ᵛ | 7.8653 ᵛ | SFPL53_0 | Refract | 8.6472 ° | |
| 11 | | Sphere | -13.2210 ᵛ | 0.2007 ᵛ | | Refract | 9.0191 ° | |
| 12 | dez 1a | Sphere | Infinity | 0.0000 | | Refract | 10.9258 ° | Basic Decenter |
| 13 | | Sphere | Infinity | 2.0000 | NLASF44 | Refract | 10.9258 ° | |
| 14 | | XY Polynom | Infinity | 0.0000 | | Refract | 10.9020 ° | |
| 15 | dez 1b | Sphere | Infinity | 0.0000 | | Refract | 8.9000 ° | Basic Decenter |
| Stop | dist | Sphere | Infinity | 0.1000 | | Refract | 8.9000 ° | |
| 17 | dez 2a | Sphere | Infinity | 0.0000 | | Refract | 10.9002 ° | Basic Decenter |
| 18 | | XY Polynom | Infinity | 2.0000 | NLASF44 | Refract | 10.9003 ° | |
| 19 | | Sphere | Infinity | 0.0000 | | Refract | 10.9861 ° | |
| 20 | dez 2b | Sphere | Infinity | 0.0000 | | Refract | 8.8861 ° | Basic Decenter |
| 21 | | Sphere | Infinity | 0.2000 ᵛ | | Refract | 8.8861 ° | |
| 22 | | Sphere | 34.5076 ᵛ | 1.5000 ᵛ | NK2FS11 | Refract | 8.8682 ° | |
| 23 | | Sphere | 13.0263 ᵛ | 5.4773 ᵛ | SFPL53_0 | Refract | 8.4819 ° | |
| 24 | | Sphere | -32.5040 ᵛ | 0.2000 | | Refract | 8.4677 ° | |
| 25 | | Sphere | 12.9694 ᵛ | 4.2985 ᵛ | SFPL53_0 | Refract | 7.9152 ° | |
| 26 | | Sphere | -48.2970 ᵛ | 1.4000 ᵛ | NK2FS11 | Refract | 7.5966 ° | |
| 27 | | Sphere | 7.0707 ᵛ | 4.7480 ᵛ | SFPL53_0 | Refract | 6.1927 ° | |
| 28 | | Sphere | 154.2904 ᵛ | 0.0200 ᵛ | | Refract | 6.1017 ° | |
| 29 | | Sphere | 9.4890 ᵛ | 3.8748 ᵛ | SNBH53_0 | Refract | 5.9238 ° | |
| 30 | | Sphere | -22.3656 ᵛ | 2.4915 ᵛ | NKZFS2_S | Refract | 5.5166 ° | |
| 31 | | Sphere | 4.2947 ᵛ | 3.3594 ᵛ | | Refract | 3.3189 ° | |
| 32 | | Sphere | -5.7477 ᵛ | 1.0000 ᵛ | NK2FS4_S | Refract | 3.2133 ° | |
| 33 | | Sphere | 149.2295 ᵛ | 1.5591 ᵛ | | Refract | 3.5610 ° | |
| 34 | | Sphere | -4.3803 ᵛ | 1.4812 ᵛ | SNBH52_0 | Refract | 3.7897 ° | |
| 35 | | Sphere | 14.6131 ᵛ | 3.5326 ᵛ | SYGH51_0 | Refract | 4.8833 ° | |
| 36 | | Sphere | -8.8360 ᵛ | 0.0200 ᵛ | | Refract | 5.2000 ° | |
| 37 | | Sphere | Infinity | 126.9000 | | Refract | 5.2300 ° | |
| 38 | | Sphere | 199.4170 | 10.9000 | NBAF4_S | Refract | 14.9841 ° | |
| 39 | | Sphere | -199.4170 | 60.0000 | | Refract | 15.1640 ° | |
| 40 | | Sphere | Infinity | 80.0000 | NBK7_SCH | Refract | 14.1092 ° | |
| 41 | | Sphere | Infinity | 48.2000 | | Refract | 13.1925 ° | |
| Image | | Sphere | Infinity | 0.0000 | | Refract | 12.4099 ° | |

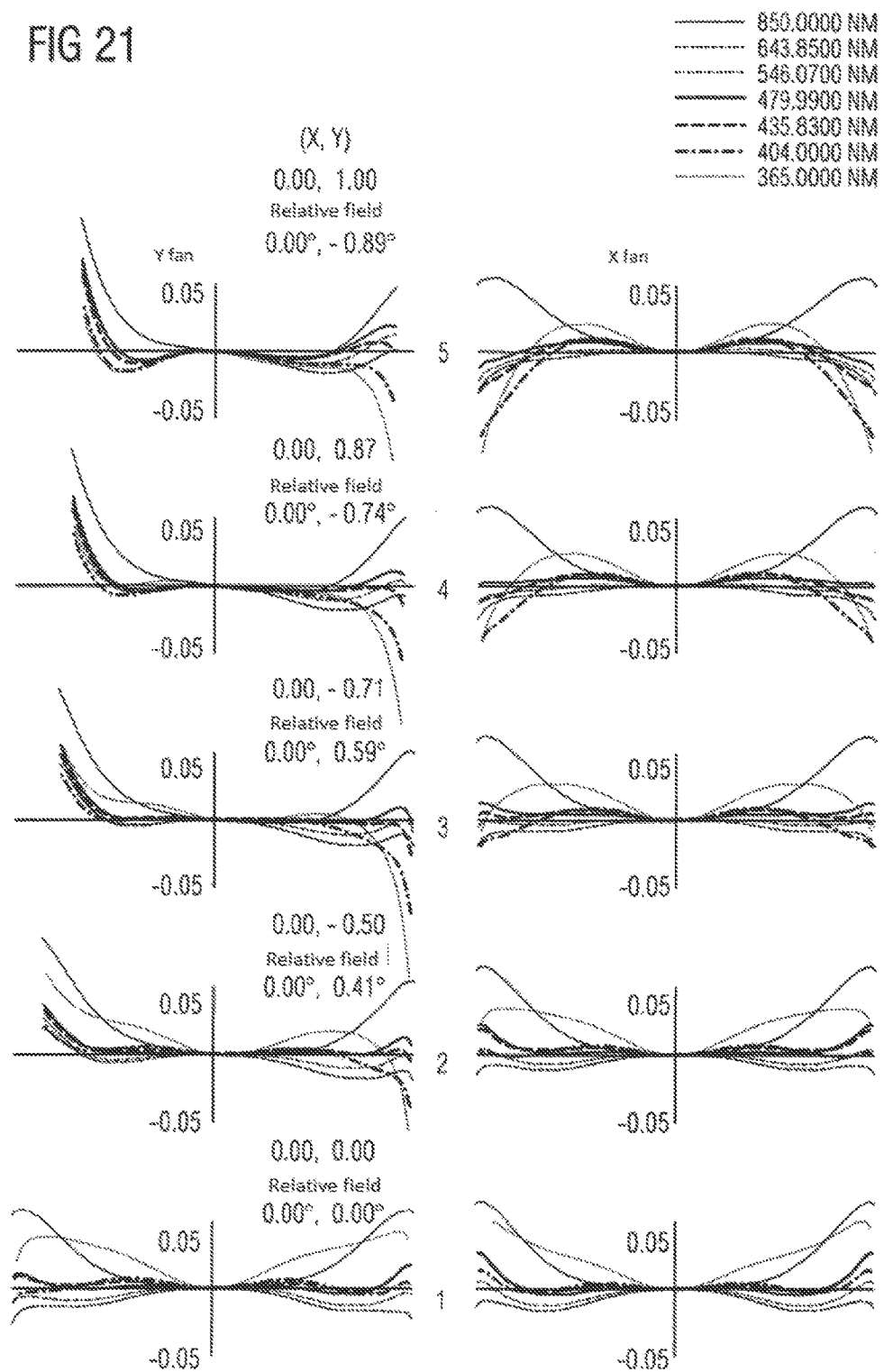

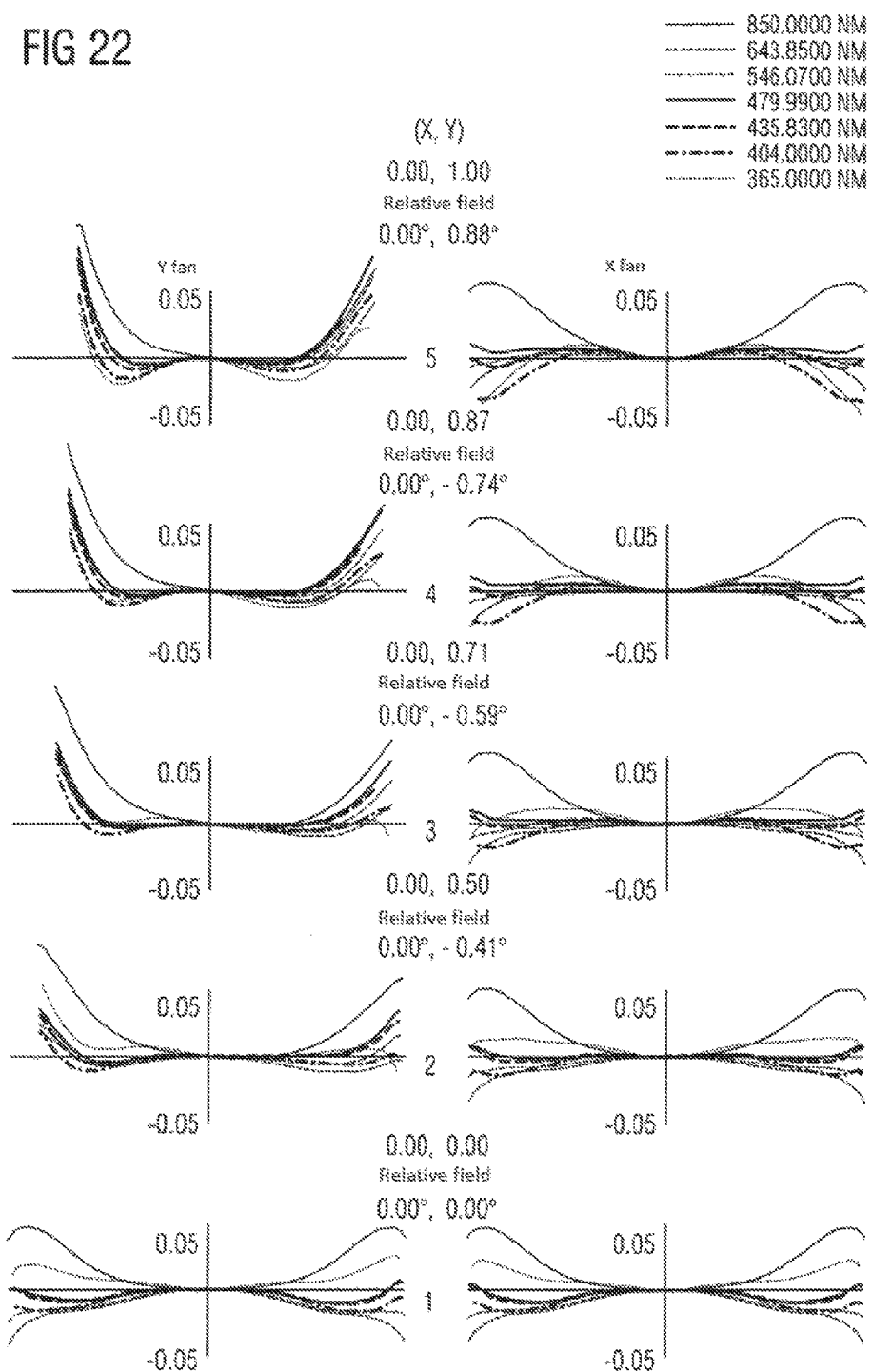

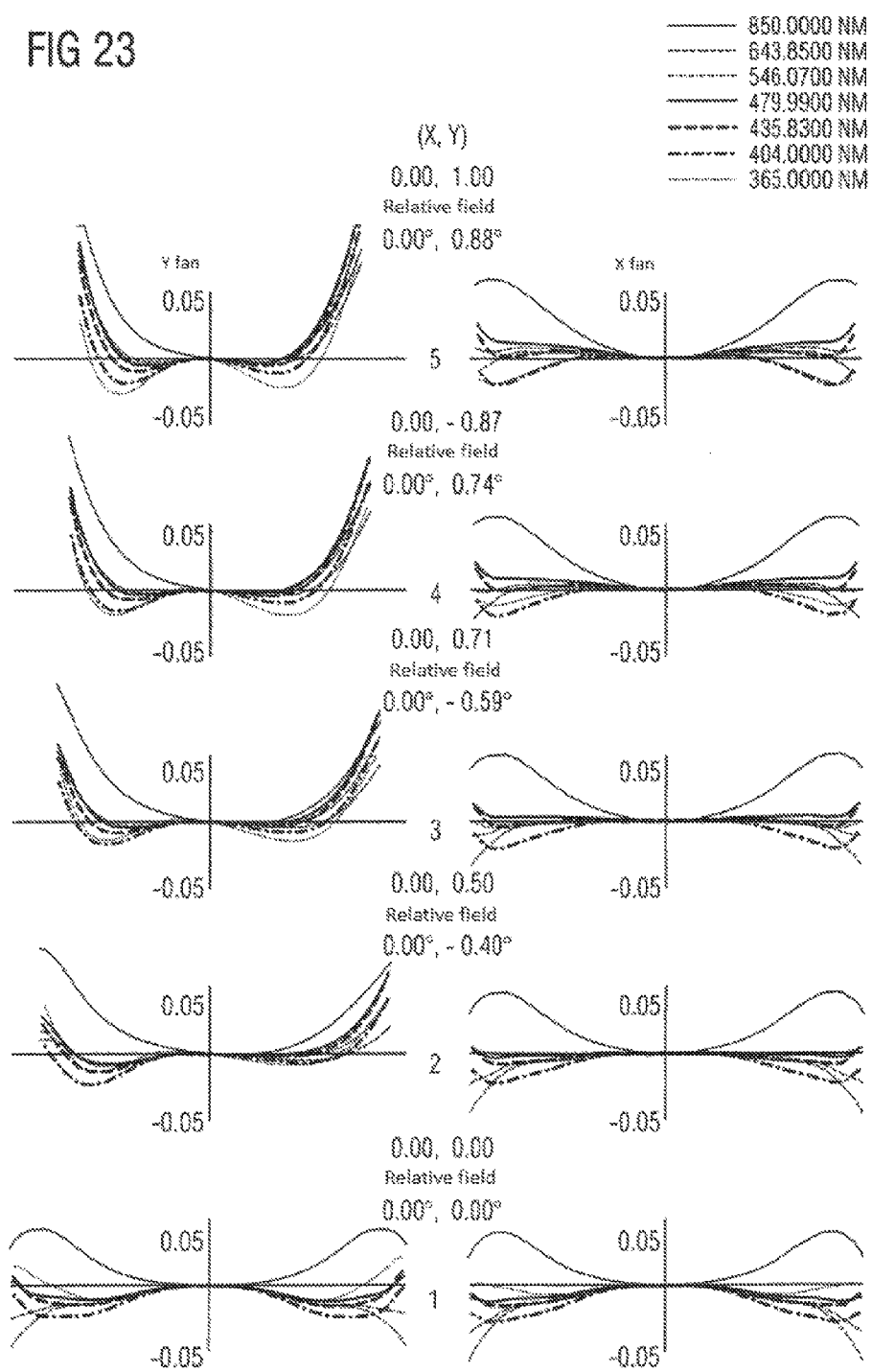

LENS AND OPTICAL OBSERVATION DEVICE

BACKGROUND OF THE INVENTION

The present disclosure relates to a lens with a first lens unit, at least one second lens unit and a pupil. In addition, the present disclosure relates to an optical observation device.

Optical observation devices typically include lenses optimized for the particular purposes of use. Optical observation devices can include, for example, microscopes, endoscopes, etc. Adding another optical element into the lens requires a new design of the lens. In other words, each lens cannot be flexibly adapted to other observation conditions. As a result, each lens can only be optimally used in a narrow field of observation conditions.

For example, microscopy includes high-aperture lenses such as, for example, immersion lenses. In immersion lenses, a liquid film is present between the lens and the cover glass covering the specimen is associated with a high lateral resolution with a low depth of field on the object side. While the smallest lateral, resolvable structure $d_{min}$ varies in diffraction-limited resolution according to the equation $$d_{min} \sim \frac{\lambda}{NA}$$

at a wavelength $\lambda$ proportional to the inverse value of the numeric aperture NA, the longitudinal resolution I, also called the depth of field, varies according to the equation $$l \sim \frac{\lambda}{NA^2}$$

proportionally to the inverse value of the square of the numeric aperture. The depth of field given by the last equation for a wavelength $\lambda$ is also called the Rayleigh length or Rayleigh unit (RE). As can be seen from the two equations, the usable depth of field rapidly decreases when the numeric aperture (NA) is raised to improve the lateral resolution. In order to be able to detect three-dimensionally expanded specimen areas, for example, entire cells or cellular organelles in natural tissue embedded in a physiological solution of common salt, and/or image information of the complete object volume with diffraction-limited resolution in microscopy, it is therefore necessary to record up to several hundred so-called Z sections. A Z section represents a recording with high lateral resolution in a given focus position, i.e., in a certain depth position of the object. A two-dimensional image with elevated depth of field that can be represented on an image display device can be produced from the individual Z sections, if necessary, with image processing methods. The focus positions of the Z scan can be adjusted by refocusing the microscope.

However, a refocusing of the microscope, for example, adjusting the object stand relative to the microscope, can induce large image errors in the microscope lens since the lens is optimized for a certain focus position. The changing of the lens in such a manner that it is optimized for another focus position requires as a rule an extensive changing of its optical components.

The image errors produced during the refocusing can be subdivided conceptually into image errors that have amounts that are large but can be calculated in advance at an average wavelength and into image errors that also have a chromatic dependency that can also be calculated in advance. Examples for the first type of image errors are different orders of the opening error, that is, different orders of the spherical aberration. Examples for the second type of image errors include the chromatic longitudinal deviation CHL as the primary, secondary and tertiary spectrum. In a similar manner image errors are induced if the refocusing takes place where the intercept length of the lens is altered with the aid of an internal focusing lens. In both instances the image quality is deteriorated drastically upon a slight change in the object distance or of the intercept length. A slight change occurs upon a changing of the object distance or a changing of the intercept length of a few Rayleigh units. However, the adding of elements, which might compensate the deterioration of the image quality, requires an extensive change to the optical design of the lens.

SUMMARY OF THE INVENTION

Therefore, a lens that can be readily optimized for different observation conditions without the design of its optical components having to be changed would be desirable.

A present embodiment provides a lens that is configurable to add an element with which the lens can be adapted to different observation conditions without an entirely new design of the lens. Another embodiment of the present disclosure provides an optical observation device.

An exemplary first embodiment can be represented in Claim 1, and the second embodiment can include an optical observation device according to Claim 18.

In an embodiment, an exemplary lens that can be designed as a microscope lens includes a first lens unit that can be designed as an individual lens or a lens group, at least one second lens unit that can also be designed as an individual lens or lens group and a real pupil that can be realized by a concrete aperture diaphragm or the real image of a beam-limiting opening. The first lens unit and the second lens unit are arranged at a distance from one another along an optical axis of the objective (which can also be folded, if necessary) so that an intermediate space is present between the first lens unit and the second lens unit. The real pupil is located in the intermediate space between the first lens unit and the second lens unit.

The first lens unit is designed in such a manner that it generates a collimated beam. In other words, the first lens unit forms an object-side image field telecentrically infinite downwards. A beam should be considered to be collimated if the edge rays enclose an angle of not more than 5°, preferably not more than 3° with the optical axis of the objective. If an image with especially small image errors is to be achieved and/or if a very high-aperture objective (NA≥1.0) is present, it is advantageous if the edge rays only enclose an angle of not more than 2° with the optical axis of the objective.

Therefore, a lens can have an accessible, real pupil and a collimated beam present on the pupil. An accessible, real pupil may include in this embodiment a real pupil that is not located inside other optical components of the lens so that the lens makes possible the arranging of, at least one pupil filter in the area of the pupil. In particular, a wave front manipulator, a phrase mask such as, for example, an annular phase plate for carrying out the Zernike phase contrast process, an apodization filter, a spectral filter, a Spatial Light Modulator (SLM) etc., or any combination of the above, can be considered as at least one pupil filter. Contrary to the lenses known in the prior art, the lens disclosed herein enables the insertion of pupil filters without requiring redesign of the other optical components of the lens. The intermediate space between the first and second lens units provides a type of internal interface of the lens for pupil filters on account of the arrangement of the real pupil in the intermediate space between the first and second lens units. Therefore, the present embodiment enables a quasi-modular construction in conjunction with pupil filters. The lens can be optimized for observation conditions or adapted for other purposes by arranging at least one pupil filter in the intermediate space between the first and second lens units.

In another embodiment of the present disclosure the first lens unit of the lens meets the condition $$\left| \frac{h_1 - f_{FG} \cdot \sin\sigma_0}{h_1} \right| \leq x,$$

for all rays of an opening beam, wherein x=0.3, preferably x=0.2 and more preferably x=0.1. In it, $h_1$ designates the height of incidence of the opening beam on the wave front manipulator, $\sigma_0$ the beam inclination angle of the edge beam against the optical axis, $f_{FG}=-n_0 \cdot f'_{FG}$ the front (object-side) focal length of the first lens unit, and $n_0$ the index of refraction of the medium or immersion medium between the object and the first lens unit.

In order to achieve asuperior image quality in the lenses in accordance with the disclosed embodiment and especially in the case of high-aperture lenses in accordance with the disclosed embodiment (NA≥0.8), the edge rays of the beam should correspond to the deviation of maximally one half of the boundaries indicated in the particular unbalanced equation for all rays of an opening beam that are present inside 71% of the pupil radius (corresponds to a circular area of 50% of the entire pupil surface). In other words, the beams should meet the above unbalanced equation for x=0.15, and preferably for x=0.1 and more preferably for x=0.05 in the area within 71% of the pupil radius.

The above unbalanced equation states that the optical sinus condition is approximately met and therefore no redistributions of the rays in the pupil occur. This can prevent the rays on the edge or in the middle areas of the pupil from striking the false position on the wave front manipulator. The smaller the value of x is, the better the sinus condition is met.

A lens with extremely high aperture (NA≥1.0) can provide a superior image quality where all rays of an opening beam that are located within 71% of the pupil radius x=0.1, preferably x=0.05 and more preferably x=0.03. The rays between 71% and 100% of the pupil radius should in this case still meet the above unbalanced equation at least for x=0.2, preferably for x=0.1 and more preferably for x=0.06.

The meeting of the above-indicated formula can also be achieved where the first lens unit includes an aspherical lens. With aspherical lens the sinus condition can be met in a simple and precise manner.

The use of at least one aspherical lens is preferable with a high aperture or large aperture angles. Furthermore, aspherical lens not only corrects the customary opening error of the spherical aberration, but also maintains the sinus condition in the first lens unit.

It should be noted the sinus condition is customarily met for an entire microscope lens since otherwise no sharp image of an extended image field would be possible. Otherwise, individual lens units of the objective do not need to meet the sinus condition as it is neither necessary nor customary. In addition, the pupils in objectives in the prior are located in the area of the exit of the objective. This is different from the objective disclosed herein.

The first lens combination of the objective can also be telecentrically formed on the object side. The first lens combination should be considered here as telecentrically on the object side if the angle of a main beam (i.e., the central beam of a ray beam, also called a heavy beam) from an object point on the edge of the object field to the optical axis is less than 3° and preferably less than 1°. The angle between such a main beam and the optical axis is also designated as the telecentry error.

Refocusing a microscope, for example, by adjusting the object table relative to the microscope, can cause large image errors on the microscope objective that drastically reduces the image quality. This is true with even a slight change in the object distance and/or the intercept length. A slight change is already given upon a change of the object distance or a change of the intercept length of a few Rayleigh units.

In addition to the desired changes of the focus position in the framework of Z scans, changes in the focus position caused by external influences can also occur. For example, refractive index fluctuations that are thermally caused (or caused in some other manner) in optical media typically cause changes in the power of refraction of the system, wherein the changes in the power of refraction of the system can additionally have a dependency on the wavelength. The change of a refractive index at an average wavelength usually occurs by a sliding lens and the change of an air volume or other suitable mechanisms for compensating defocus errors can be compensated sufficiently. However, the dependency on wavelength of the defocusing remains as a residual error that cannot be otherwise compensated. Moreover, the change of the refractive index of the immersion medium not only brings about a shift of focus in the base wavelength, but also spherical aberration that can be compensated only with great difficulty with conventional means. A shift of focus in the base wavelength could be compensated as mentioned above by conventional refocusing. Problematic spherical aberration always occurs when the phase thickness of the immersion medium (i.e., its spatial thickness multiplied by its refractive index) changes in the divergent beam path in front of the objective since the base objective can always be designed only for a set phase thickness of the immersion medium.

The described difficulties can be overcome with the lens in accordance with the disclosed embodiments. In this disclosure at least one wave front manipulator is present in the intermediate space between the first and second lens units as a pupil filter which the manipulator includes a first optical component with at least one refractive freeform surface or with a diffractive surface and includes at least one second optical component with at least one refractive freeform surface or a diffractive surface. The first and second optical components are arranged sequentially along the optical axis so that they can be moved relatively to one another in a direction of movement vertical to the optical axis. Wave front manipulators with refractive freeform surfaces are known, for example, from U.S. Pat. No. 3,305,298 and with diffractive surfaces from I. M. Barton et al. "Diffractive Alvarez Lens" OPTICS LETTERS vol. 25, No. 1, Jan. 1, 2000. Therefore, these documents are referred to regarding possible embodiments and regarding the construction of the wave front manipulators.

The present disclosure provides an adaptive lens where the optical effect of at least one influencing magnitude to be viewed as variable in a given application can be compensated, wherein the adaptive lens has an almost constant and diffraction-limited image quality over the entire adjustment range.

The wave front manipulator can be arranged in such a manner that in the intermediate space between the first and second lens units the real pupil is present at the site of the wave front manipulator. Alternatively, it can be arranged in such a manner that that the real pupil is present in the intermediate space between the first and second lens units in front of or behind the wave front manipulator, wherein the wave front manipulator then be arranged as closely as possible to the pupil. If the wave front manipulator is arranged at the site of the pupil, the pupil can be located in particular between the first and second optical components of the wave front manipulator. Preferably, the pupil is designed as a real image of a beam-limited opening since it then does not need any construction space in the area of the wave front manipulator. Furthermore, a real image can be freely arranged in the area of the wave front manipulator as a concrete aperture since the image can basically also be arranged inside the first optical component or inside the second optical component. In the case of a concrete aperture diaphragm on the other hand, the wave front manipulator is preferably arranged directly in front of or behind the aperture diaphragm. In front of or behind the aperture diaphragm is advantageous to the extent that the optical components of the wave front manipulator can be arranged closer to each other than would be the case with a concrete aperture diaphragm arranged between the optical components. However, a concrete aperture diaphragm can basically be arranged between the optical components of the wave front manipulator if sufficient space is present between them.

At least one image error such as, for example the focusing, spherical aberration, astigmatism or coma can be adjusted in a continuously variable manner with the described embodiment of the lens in accordance with the present disclosure, wherein the other image errors remain substantially uninfluenced. The continuous adjustability of the image error makes it possible, for example, to cancel image errors caused due to changes of the focus position by adjusting an appropriate compensating image error with the aid of the wave front manipulator. For example, a defocusing caused by a changing of the focus position can be compensated by an appropriate negative defocusing produced with the aid of the wave front manipulator to the extent that the wave front manipulator has suitable freeform surfaces. In a corresponding manner even other image errors caused from the outside such as, for example, astigmatism or coma can be compensated in that a corresponding, negative image error is induced with the aid of a wave front manipulator with a suitably designed freeform surface, which error cancels out the externally caused image error. Expressed more generally, the solution formulation can be used in the adaptive lens of the present disclosure to change at least one predetermined, monochromatic image error coefficient at a given reference wavelength. It can be designed in particular in such a manner that that the change of the corresponding image error coefficient changes as little as possible over the wavelength range used for the image so that an achromatic wave front manipulator can be realized. However, it can also be designed in such a manner that that it makes the chromatic change of an image error coefficient of the wave front of a beam adjustable. In particular, an image error coefficient can be made possible in this manner by a variable coordination of the primary or the secondary longitudinal color error (CHL) of the lens.

The using of the wave front manipulator and its arrangement in the lens of the present disclosure makes it possible to construct a high-aperture microscope lens, i.e., a microscope lens with a numeric aperture of at least 0.8 and in particular 1.0 in such a manner that a qualitative high-grade image is ensured over a broad adjustment range of the image error coefficient. In particular, the present disclosure also makes it possible to design such an adaptive lens in such a fashion that it makes possible an image limited by diffraction. It is especially significant in this connection that the leading lens unit on the objective side generates a collimated beam and that the wave front manipulator is arranged between the two lens units in the area of the collimated beam.

The influencing of an image error (represented by an image error coefficient) is possible independent of the other image errors with the previously described adaptive lens in accordance with the present disclosure. However, it is also desirable in almost all practically relevant instances to keep the optical image largely free of color errors over the adjustment range. However, this can only be achieved with great difficulty if at all with conventional means. For example, fluctuations of the index of refraction of an optical medium that are caused thermally or in some other way frequently generate changes in the system reactive power that are heavily dependent on the wavelength. While the refractive power change in an average wavelength can usually be compensated sufficiently well by a known defocusing compensator (for example a slide lens, a change of the air space between two lenses, etc.), the wavelength dependency of the defocusing remains as a residual error that cannot be compensated otherwise. Therefore, this also makes it possible in an embodiment of the adaptive lens with a wave front manipulator to reduce the wavelength dependency of the compensating image error. In order to achieve this, an immersion medium contacting the two components can be present between the first and second optical components. Without such a measure a variable color error can occur in the adjusting of the image error coefficient. Such an error would be manifested substantially as a longitudinal color error (CHL). In other words, the monochromatic image error, for example a defocus, would be able to be compensated independently of the other image error coefficients but the adjusted, compensating defocus could lead to different intercept lengths in the case of different wavelengths. As long as the focal length differences in the compensating defocus are not too great, this disturbs the image only a little to not at all. However, if great deviations occur in the focal length, this can result in a longitudinal color error that noticeably deteriorates the image quality. Corresponding considerations also apply to the other monochromatic image errors since even in the case of the latter the compensating image error adjusted with the aid of the wave front manipulator has a wavelength dependency.

Potential immersion media can include liquids, for example very pure water, saline solutions, immersion oils, etc. and elastic optoputties. Since only a lateral movement of the first and second optical components takes place, the wave front manipulator with immersion medium can have a flat construction, i.e., a slight extension vertically to the lateral direction of movement.

A suitable adaptation of the index of refraction and of the Abbe number of the immersion medium to the index of refraction and the Abbe number of the material from which the optical elements are produced can achieve a variably adjustable wave front manipulation whose effect is independent of the wavelength over an extended wavelength range so that the wave front manipulator of the present disclosure can be used as an achromatic wave front manipulator. Therefore, the above-described color errors, in particular the longitudinal color error can be largely avoided in the adjusted, compensating image error with the aid of this design of the wave front manipulator.

If the immersion medium or the material of the first and second optical components of the wave front manipulator has a dispersion course deviating from the normal straight line, higher orders of the color errors, that is, secondary and tertiary spectra of the color orders, can also be corrected. For the correcting of the tertiary color error the immersion medium as well as the material of the components of the wave front manipulator have a dispersion course deviating from the normal straight line.

In another embodiment of the lens of the present disclosure at least one second wave front manipulator is arranged between the first and second lens units. A second image error can be corrected with the second wave front manipulator independent of the remaining image errors as was previously described regarding the first wave front manipulator. Therefore, as many as desired can be corrected independent of each other by raising the number of wave front manipulators located between the first and second lens units. That which was previously explained regarding the possible design of the wave front manipulator applies here to the design of the wave front manipulators. Even the lateral movements of the optical components can be coupled to each other by at least two wave front manipulators.

In the lens according to the present disclosure the second lens unit can be constructed in particular to be afocal, i.e., it acts neither in a collecting nor in a scattering manner so that beams entering in parallel also exit again as parallel beams. In this manner an afocal optical interface can be made available that makes it possible to make the lens freely combinable with various other optical systems. Thus, for example, an appropriately designed afocal microscope lens can be freely combined with various tubular microscope systems. Such an interface is also called an infinite interface.

The lens in accordance with the present disclosure can be in particular a microscope lens designed to cooperate with an immersion medium bordering on the first lens unit on the object side. In this manner microscope lenses with high numeric apertures (NA≥0.8) up to very high numeric apertures (NA≥1.0) can be realized.

According to another aspect of the present disclosure an optical observation device with the disclosed lens is provided. The advantages and qualities described referring to the disclosed lens can therefore be realized in the optical observation device in accordance with the present disclosure. Potential optical observation devices can be, for example, microscopes such as, for example, operation microscopes or in particular immersion microscopes but may also include endoscopes, cameras, optical measuring devices, etc.

If the lens has an infinite interface, the latter can be followed by a third lens unit that generates together with the first and the second lens unit a real intermediate image that can either be observed visually enlarged or can be recorded by an image receiver. Such a third lens unit can be constructed in particular as a tubular lens group.

Other features, qualities and advantages of the present disclosure present disclosure result from the following description of exemplary embodiments with reference made to the attached figures.

BRIEF DESCRIPTION OF THE DRAWINGS

FIG. 5 shows a first concrete example for a microscope with a lens of the present disclosure.

FIG. 6 shows the lens of FIG. 5 in a first position of the optical component of the wave front manipulator relative to one another.

FIG. 7 shows the lens of FIG. 5 in a second position of the optical components of the wave front manipulator relative to one another.

FIG. 8 shows the lens of FIG. 5 in a third position of the optical components of the wave front manipulator relative to one another.

FIG. 9 shows the construction data of the microscope of FIG. 5 in tabular form.

FIG. 10 shows the wave front errors caused by the lens when the wave front manipulator is in the position shown in FIG. 6.

FIG. 11 shows the wave front errors caused by the lens when the wave front manipulator is in the position shown in FIG. 7.

FIG. 12 shows the wave front errors caused by the lens when the wave front manipulator is in the position shown in FIG. 8.

FIGS. 13 to 15 show the wave front errors which would occur in the lens from the FIGS. 6 to 8 without the wave front manipulator.

FIG. 16 shows a second concrete example for a microscope with a lens in accordance with the present disclosure.

FIG. 17 shows the lens of FIG. 16 in a first position of the optical component of the wave front manipulator relative to one another.

FIG. 18 shows the lens of FIG. 16 in a second position of the optical components of the wave front manipulator relative to one another.

FIG. 19 shows the lens of FIG. 16 in a third position of the optical components of the wave front manipulator relative to one another.

FIG. 20 shows the construction data of the microscope of FIG. 16 in tabular form.

FIG. 21 shows the wave front errors caused by the lens when the wave front manipulator is in the position shown in FIG. 17.

FIG. 22 shows the wave front errors caused by the lens when the wave front manipulator is in the position shown in FIG. 18.

FIG. 23 shows the wave front errors caused by the lens when the wave front manipulator is in the position shown in FIG. 19.

DETAILED DESCRIPTION OF THE PREFERRED EMBODIMENT

Figure 1:
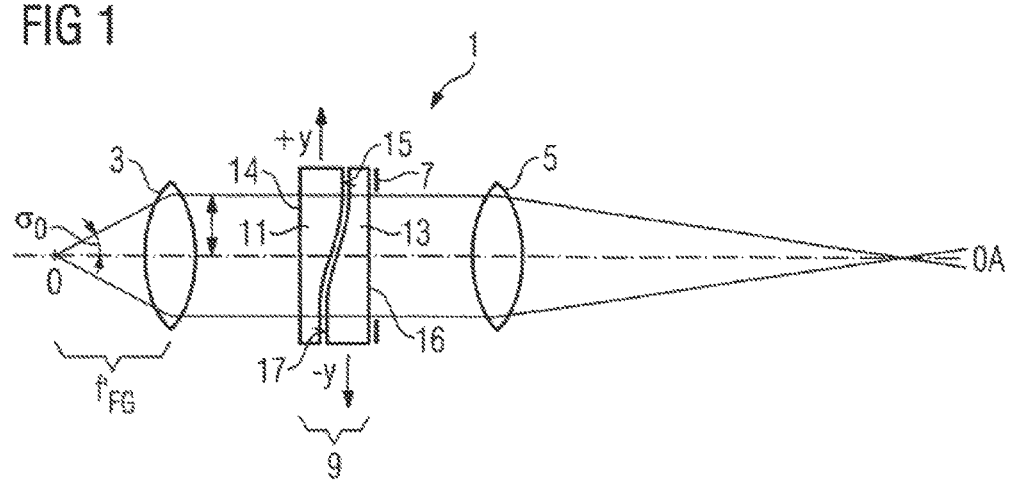
FIG. 1 Shows the basic construction of the lens in accordance with the present disclosure.

A first exemplary embodiment for a lens in accordance with the present disclosure is shown in FIG. 1. This schematic exemplary embodiment simultaneously shows the simplest construction of the lens in accordance with the present disclosure and makes possible the basic understanding of its method of operation. The lens 1 of the first exemplary embodiment, which is designed as an adaptive lens, comprises an individual lens 3 as the first lens unit, an individual lens 5 as the second lens unit, an aperture diaphragm 7 and the wave front manipulator 9 which are all arranged along an optical axis OA of the objective. The wave front manipulator 9 is located between the first lens 3, which represents the object-side lens of the objective 1, and the second lens 5, which represents the image-side lens of the objective. The aperture diaphragm 7 is arranged adjacent to the wave front manipulator 9. In the present exemplary embodiment it is positioned after the wave front manipulator 9 in the direction of the image-side lens 5. However, it can also be alternatively positioned in front of the wave front manipulator 9 in the direction of the object-side lens 3. If the objective 1 is designed in such a manner that the real image of a diaphragm is the aperture diaphragm, the virtual diaphragm can also be located at the position of the wave front manipulator 9.

The wave front manipulator 9 comprises two optical components 11, 13 which each have a plane surface 14, 16 and a freeform surface 15, 17. In the present exemplary embodiment the optical components 11, 13 of the wave front manipulator 9 are arranged in such a manner relative to each other that the freeform surfaces 15, 17 lie opposite one another. The plane surfaces 14, 16 then form the entrance surface into the wave front manipulator 9 and the exit surface from the wave front manipulator 9. I can be stated regarding FIG. 1 that the extension of the wave front manipulator and the profile depths of the freeform surfaces are shown in an exaggerated manner for the sake of the clarity of the figures.

The optical components 11, 13 of the wave front manipulator 9 are arranged successively in the direction of the optical axis OA and can shift laterally against one another, that is, vertically to the optical axis, as is indicated in the figure by the arrows −y and +y. In the zero position shown in the figure the refractive freeform surfaces 11, 13 behave in an exactly complementary manner relative to one another so that the two optical components in this position have substantially the optical effect of a plane-parallel plate, that is, of an optical zero element.

The optical components 11, 13 can consist, for example, of glass, plastic or of crystalline material. The selection of the material can be a function in particular of the intended use of the wave front manipulator 9 in the objective 1. In as far as the objective is used in the visible optical spectral range, the selection will as a rule be glass or plastic. If the objective is to be used in the ultraviolet spectral range, the components 11, 13 can consist, for example of quartz glass or a crystalline material such as, for example calcium fluid or barium fluid.

As is apparent from FIG. 1, a collimated beam path is present in the objective 1 between the object-side lens 3 and the image-side lens 5, i.e., from object-side lens 3 the object-side image field O is imaged infinitely. A beam can be considered to be collimated in a sufficient approximation if its edge rays enclose an angle of not more than 5° with the optical axis of the objective. A beam can be considered to be collimated in a good approximation if its edge rays enclose an angle of not more than 3° with the optical axis of the objective and as collimated in a very good approximation if its edge beams enclose an angle of not more than 2° with the optical axis of the objective. The very good approximation of 2° is especially advantageous if especially small, not intentionally induced image errors are to be present and/or if the objective is very high-aperture, that is, has a numeric aperture of (NA≥1.0.

Furthermore, the object-side lens 3 is constructed in such a manner that it approximately meets the Abbe sinus condition, which states $$h_1 = f_{FG} \cdot \sin \sigma_0 = n_0 \cdot f'_{FG} \cdot \sin \sigma_0.$$

It can be considered to be a sufficient approximation if for all rays of a beam that are present within 71% of the maximal pupil radius the value of the expression $f_{FG} \cdot \sin \sigma_0$ does not deviate from the value for $h_1$ more than 15% of the value of $h_1$, a good approximation if it does not deviate more than 10%, as a very good approximation if it does not deviate more than 5% and an excellent approximation if it does not deviate more than 3%. In other words, the first lens unit of the objective meets the condition $$\left| \frac{h_1 - f_{FG} \cdot \sin \sigma_0}{h_1} \right| \leq$$

for all rays of an opening beam that are present inside 71% of the pupil radius, wherein x=0.15, preferably x=0.1, more preferably x=0.05 and especially x=0.03.

The rays of a beam that are present inside 71% of the maximal pupil radius enter into the inner circular area of the pupil, which constitutes 50% of the pupil surface.

In the prior art the sinus condition is typically met by a microscope objective as an entirety since this is necessary for being able to generate a sharp image of objects that are on the optical axis OA and also of objects that are present outside of the optical axis OA. Moreover, in the objective in accordance with the present disclosure the first lens unit, which represents a subunit of the objective lens system, also meets the sinus condition. The meeting of the sinus condition by the object-side lens unit of the objective prevents redistributions of the rays from arising in the pupil, as a result of which the rays on the edge or in the center of the pupil would strike the wave front manipulator on the false position.

It is noted at this point that it is clear to a person skilled in the art that an exact collimated ray path cannot be generated with an optical system but can only be generated approximately, and also that the sinus condition cannot be exactly met but rather only approximately. Therefore, if the collimated ray path for the meeting of the sinus condition is discussed in the exemplary embodiments for the present disclosure, it should always be understood that a ray path collimated in sufficient approximation or a sinus condition met in sufficient approximation is present.

In the adaptive objective 1 the wave front manipulator line serves to induce defined image errors that cancel image errors generated in the objective by external conditions, for example variations in the focus length or variations of temperature. The generation of a defined image error takes place here by manipulating the wave front of the beam. The wave front of a beam is given by the points of the electromagnetic wave that have the same phase. Mathematically, the wave front can be represented by a superpositioning of functions of a complete function system. Typically, Zernike polynomials are used as function systems, wherein the individual Zernike polynomials represent different image errors. In the representation of the wave front a Zernike coefficient is associated with each Zernike polynomial, whereby the wave front is described by the Zernike coefficients. The freeform surfaces 15, 17 of the optical components 11, 13 of the wave front manipulator 9 can be selected in such a manner that they generate a manipulation of the wave front that can be described by a Zernike polynomial. The associated Zernike coefficient is determined by the amount of the relative shifting of the two optical components 11, 13. A mathematically equivalent description can also be achieved with the development according to other complete function systems, for example by a Taylor development. In the following the basic principles for constructing the freeform profiles using a Taylor development will be presented.

The freeform surface can be described in an explicit surface presentation in the form z(x,y) by a polynomial which has only even powers of x in a coordinate x vertical to the direction of movement of the optical components 11, 13 and only uneven powers of y in a coordinate y parallel to the direction of movement. The freeform surface z(x,y) can be described at first in a general manner, for example, by a polynomial development of the form $$z = \sum_{m,n=1}^{\infty} C_{m,n} x^m y^n \quad (1)$$

wherein $C_{m,n}$ is the development coefficient of the polynomial development of the freeform surface in the power m relative to the x direction and in the power n in the y direction. Here x, y and z designate the three Cartesian coordinates of a point located on the surface in the local, surface-related coordinate system. The coordinates x and y are to be inserted here into the formula as dimensionless coefficients of measure in so-called lens units. Lens units signifies here that all lengths are indicated at first as dimensionless numbers and are interpreted later in such a manner that they are continuously multiplied by the same measuring unit (nm, μm, mm, m). The background is the fact that the geometric optical system is scale-invariant and does not have, in contrast to the wave optical system, a natural length unit.

A pure defocusing effect can be brought about according to the teaching of Alvarez if the freeform surface of the optical components 11, 13 can be described by the following polynomial of the third power:

$$z(x, y) = K \cdot \left( x^2 \cdot y + \frac{y^3}{3} \right) \quad (2)$$

It is assumed here that the lateral shifting of the optical components 11, 13 takes place along the y axis, which is defined as a result. If the shift is to take place along the x axis, the role of x and y is to be appropriately exchanged in the above equation. The parameter K scales as it were the profile depth and fixes in this manner the achievable power of refraction per unit of the lateral shifting path s.

For beams incident parallel to the optical axis OA and air (refractive index n=1) between the two optical components 11, 13 the lateral shifting of the optical components by a stretch s=|±y| brings about a change of the wave front according to the equation:

$$\Delta W(x, y) = K \cdot \left( 2 \cdot s \cdot (x^2 + y^2) + 2 \cdot \frac{s^3}{3} \right) \quad (3)$$

That is, a change of the focus length by changing the parabolic wave front portion plus a so-called piston term (Zernike polynomial with j=1, n=0 and m=0, wherein the latter corresponds to a constant phase and then does not act precisely on the imaging qualities if the optical element of the present disclosure is in the infinite beam path, i.e., in the area of a collimated beam. Even otherwise the piston term can usually be disregarded for the imaging qualities.

The surface power of refraction of such a wave front manipulator functioning as a variolens is given by the following formula:

$$\Phi_v = 4 \cdot K \cdot s \cdot (n-1) \quad (4)$$

Here, s is the lateral shifting path of an element along the y direction, K is the scaling factor of the profile depth and n is the index of refraction of the material forming the lens at the particular wavelength.

Furthermore, in order to minimize the central thickness of the element a term proportional to y (wedge term or tilting term) can be added whose optical effect on the two freeform surfaces is then almost canceled but makes possible a minimizing of the central thickness of the element. A pure tilting term on the freeform surfaces is optically without effect in a first approximation and therefore also does not produce in particular any color errors.

It is possible that the two optical components 11, 13 moved relative to one another as shown in FIG. 1 are oriented in such a manner that the two freeform surfaces 15, 17 face one another. In this case it is especially simple to carry out an adjustment of the zero position, namely, in that the distance between the two optical components 11, 13 is reduced until the two components touch each other. In this position a centering of the optical components automatically takes place. Subsequently, the distance in the axial direction can be increased just enough so far again that the two optical components 11, 13 do not touch one another in the lateral movement during the proper functional operation. However, it is also basically alternatively possible to orient the two optical components 11, 13 in such a manner that the freeform surfaces 15, 17 face away from one another.

It is also possible that the freeform surfaces can have additional terms of a higher power for influencing individual image errors. For example a term with the form $$z(x, y) = K \cdot \left( y \cdot x^4 + \frac{2}{3} \cdot (x^2 \cdot y^3) + \frac{y^5}{5} \right) \quad (5)$$

would primarily influence the primary spherical aberration and could therefore, for example, help to correct the spherical aberration occurring when focusing into another specimen depth for applications in the area of microscopy. Even a partial or complete compensation of the spherical aberration produced by the change in the thickness of the element (piston term) in the convergent beam path can take place in this manner.

The structural profiles can be freely superposed, i.e., one structure for changing the power of refraction and one structure for changing the spherical aberration can be superposed in a freeform surface 15, 17, so that a corresponding wave length manipulator varies a power of refraction effect upon the shifting of the optical components 11, 13 against one another and at the same time changes a spherical aberration, wherein both changes are proportional to one another with any desired proportionality factor, that is, however, to be securely selected in advance.

Furthermore, it is also possible that both sides of the moved optical components 11, 13 have an active shape in accordance with the above-described shapes. For example, a symmetrical division of the surface profile according to the above formula onto the front surface and back surface of a component could bring it about that the profile depth on each surface remains sufficiently small so that, for example, a photolithographic production of the elements, that typically makes possible only maximal profile depths in the range of <10-30 µm, is facilitated. In addition to the facilitated production, smaller profile depths basically also have the advantage that they cause fewer undesired image errors in comparison to larger profile depths. Undesired image errors are produced on the profiles of the optical components of a freeform element on account of the finite interval between the optical components, which has the result that a beam that is refracted on the freeform surface of the first optical component at a certain distance from the optical axis does not strike the second freeform surface exactly at the point corresponding to the above but rather shifts it somewhat. The errors produced in this manner increase drastically (superlinearly) with the profile depth because greater profile depths not only have a greater refractive action but furthermore require a greater distance between the elements. A splitting of the freeform profiles on the one side and the backside of the freeform elements is therefore always advantageous from the optical standpoint even if more expensive in the production.

According to Lohmann (cf. Appl. Opt. vol. 9, No. 7, (1970), pp. 1669-1671) it is possible to produce variolenses that are largely equivalent to the teaching of Alvarez in which two freeform surfaces are described, for example, in the lowest power by an equation with the form $$z(x \cdot y) = A \cdot (x^3 + y^3) \tag{6}$$

and the relative movement of the optical components 11, 13 to one another takes place along a straight line running under 45° opposite the x and the y axis vertically to the optical system axis. The constant A is again a free scaling constant which describes the maximal profile depth of the freeform surfaces and as a consequence the change in the power of refraction per path length. This does not concern in the description according to Lohmann an independent solution but rather substantially only an alternative representation.

Other details for the construction of the freeform surfaces 15, 17 with which the variable power of refraction effect can be achieved is described in U.S. Pat. No. 3,305,294. Reference is made to this document regarding the construction of the freeform surfaces.

Monochromatic image errors can be corrected with the previously described wave front manipulator at a certain wavelength in that an occurring image error is cancelled by a purposefully induced counteracting image error. However, there is also the possibility of designing the wave front manipulator in such a manner that that it not only corrects monochromatic image errors but also chromatic image errors. A wave front manipulator with which the correction of chromatic image errors is also possible is shown in FIG. 2.

Figure 2:
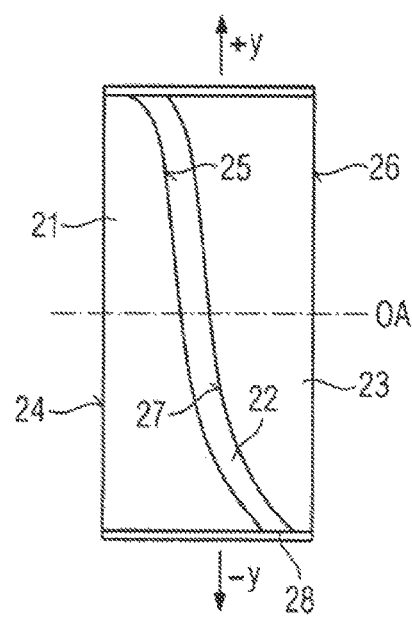
FIG. 2 Shows a special embodiment of the wave front manipulator as it can be used in the lens.

Before the wave front manipulator shown in FIG. 2 is discussed, the conditions for dichromatism, trichromatism and for the correction of the secondary spectrum are briefly presented.

The condition for achromatism of a variolens consisting of any number of elements is:

$$\sum_{j=1}^{k} \frac{\varphi_l}{v_j(\lambda_1, \lambda_2)} = 0$$

in which $\varphi_j$ designates the power of refraction of the jth lens and $v_j(\lambda_1, \lambda_2)$ the Abbe number of the medium from which the lens is constructed, with reference made to the secondary wavelengths $\lambda_1, \lambda$, defined by:

$$v(\lambda_1, \lambda_2) = \frac{n(\lambda_0) - 1}{n(\lambda_2) - n(\lambda_1)}$$

If a given system power of refraction $\Phi_{ges}$ is to be achieved at the same time, the following secondary condition is furthermore to be met:

$$\sum_{j=1}^{k} \varphi_l = \phi_{ges}$$

In a diachromatically ("achromatically") corrected optical system the system power of refraction at the two wavelengths $\lambda_1$ and $\lambda_2$ is exactly equal. It is then said that the primary longitudinal color error disappears. However, in all other wavelengths, in particular in the average wavelength $\lambda_0$, it still always deviates. The deviation is called the "secondary spectrum" of the longitudinal color error.

The above argumentation can be appropriately and directly transferred onto other wave front effects of the wave front manipulator element. The dichromatism remains exactly the same and an analogous equation takes the place of the second equation (constant power of refraction) and establishes a requirement (secondary condition) for the total system effect on the desired wave front error (e.g. spherical aberration).

For the correction of the secondary spectrum the magnitude $$P_{\lambda_0, \lambda_1, \lambda_2} = \frac{n(\lambda_0) - n(\lambda_1)}{n(\lambda_2) - n(\lambda_1)}$$

is defined as the so-called partial dispersion coefficient P of a medium at the reference wavelength $\lambda_0$ and the secondary wavelengths $\lambda_1$ and $\lambda_2$.

The condition for the disappearance of the secondary spectrum at $\lambda_0$ is explicitly:

$$\sum_{j=1}^{k} \frac{\varphi_j}{v_j} \cdot P_{j, \lambda_0, \lambda_1, \lambda_2} = 0.$$

This additional condition can only be met if at least one medium has a partial dispersion coefficient P that significantly deviates from the so-called normal straight line.

It turns out that, e.g. organic immersion oils clearly deviate from the normal straight lines of the dispersion relationship known for optical glasses. Consequently, a variolens in accordance with the present disclosure or a wave front manipulator in accordance with the present disclosure can be designed in such a manner that that the secondary spectrum disappears. That explicitly says that the wave front effect of the wave front manipulator of the present disclosure can have an exactly identical (given) effect when maintaining the above condition at 3 wavelengths $\lambda_0$, $\lambda_1$ and $\lambda_2$. In the case of a trichromate ("apochromate") the wave front effect of a wave front manipulator in accordance with the present disclosure is exactly the same as a generalization of the above conditions at exactly three wavelengths $\lambda_0$, $\lambda_1$ and $\lambda_2$. The explicit condition for trichromatism in a system with at least three powers of refraction and media that can be adjusted independently of each other can be gathered from current textbooks.

The wave front manipulator shown in FIG. 2 comprises two optical components 21, 23 that are arranged successively along an optical axis OA and can shift laterally, i.e., vertically to the optical axis OA against one another as is shown in the figure by the arrows in the −y direction and the +y direction. In the present wave front manipulator each of the two optical components 21, 23 have a refractive freeform surface 25, 27 on one side and a plane surface 24, 26 on the side facing away from the freeform surface. The optical components 21, 23 are arranged in such a manner relative to one another that their freeform surfaces 25, 27 lie opposite one another. The freeform surfaces 25, 27 behave exactly in a complementary manner to one another in a zero position so that the two optical components 21, 23 are equivalent to a plane-parallel plate in a zero position.

An immersion medium 22 is present between the two optical elements 21, 23 which can be a liquid such as, e.g. very pure water, a saline solution, an immersion oil, etc. in the wave front manipulator shown in FIG. 2. In order to keep the liquid in the intermediate space between the two optical components 21, 23, the circumferential surface of the wave front manipulator is provided with an elastic sleeve 28 which prevents the liquid immersion medium 22 from running out and also keeps the optical components 21, 23 tight relative to one another upon their lateral movement. The sleeve 28 can be formed, e.g. from a plastic sheet or in particular from an elastic sealing ring which can consist of highly elastic rubber. However, instead of a sleeve of elastic material another liquid-tight seal can also be used, e.g. in the form of a bellows construction. Since the lateral movement of the optical components 21, 23 is only fractions of a millimeters in many instances, a plurality of common, liquid-tight seals can basically be used. Another alternative is the possibility of providing the surfaces to be moistened with the immersion liquid with an adhesive coating which holds a thin immersion film fast between the freeform surfaces by adhesion forces and thus prevents the immersion liquid from running out.

The optical components 21, 23 themselves can consist, e.g., of glass, plastic or of crystalline material. The selection of the material can depend in particular on the intended use of the wave front manipulator. If the latter is to be used in the optical spectral range, the selection will generally be glass or plastic. On the other hand, if it is to be used in the ultraviolet spectral range the optical components 21, 23 typically consists of quartz glass or a crystalline material, e.g. of calcium chloride or barium fluoride. In the ultraviolet spectral range, e.g. very pure water is considered as immersion liquid.

In the following the adaptation of the immersion medium 22 to the material of the optical components 21, 23 is described using two concrete examples. The first example is a description of an adaptation for making an achromatic variolens available before a description of an adaptation for making available a defined adjustment of the longitudinal color error without changing the focus position as the second example.

For making an achromatic variolens available, the condition for the adaptation of the immersion medium 22 to the material of the optical components 21, 23 in the wave front manipulator can be derived as follows:

The two optical components 21, 23 moved to one another form a power of refraction $\Phi_1 = 4 \cdot k \cdot s \cdot (n_1 - 1)$ and the variable "immersion medium lens" between the plates a power of refraction $-\Phi_2 = 4 \cdot k \cdot s \cdot (n_2 - 1)$, wherein k represents the scaling factor of the freeform profile function, s the shifting path of the elements and $n_1$ and $n_2$ the index of refraction of the material of the optical components 21, 23 and of the immersion medium 22 at an average wavelength of the spectral range observed.

The condition for achromatism for two lenses standing closely together is generally:

$$\frac{\Phi_1}{v_1} + \frac{\Phi_2}{v_2} = 0. \qquad (7)$$

In it $v_1$ and $v_2$ designate the Abbe number of the material of the optical components 21, 23 and the Abbe number of the immersion medium 22. The following condition can be set for the achromatic variolens by using the equations for the power of refraction $\Phi_1$ and $\Phi_2$ in equation (7):

$$\frac{n_1 - 1}{v_1} - \frac{n_2 - 1}{v_2} = 0. \qquad (8)$$

Of course, due to the only limited selection of available optical materials, especially when considering special requirements such as ageing resistance, thermal expansion, etc., in practice they can also deviate slightly from the above condition without leaving the scope of the present disclosure. A parameter range for a variolens can be characterized approximately by the following conditions:

$$\left| \frac{n_1 - 1}{v_1} - \frac{n_2 - 1}{v_2} \right| < 0{,}05 \qquad (8a)$$

The following should even preferably apply:

$$\left| \frac{n_1 - 1}{v_1} - \frac{n_2 - 1}{v_2} \right| < 0{,}01 \qquad (8b)$$

and the following can apply even more preferably:

$$\left| \frac{n_1 - 1}{v_1} - \frac{n_2 - 1}{v_2} \right| < 0.001 \qquad (8c)$$

An achromatic wave front manipulator that is to influence a certain Zernike term instead of a defocusing also has to meet the same achromatization condition (7) and/or (8a) to (8c).

An element that by way of example makes a certain amount of spherical aberration available independently of the wavelength could be made available by two optical components whose freeform surfaces 25, 27 have the following form $$z(x, y) = k \cdot \left( y \cdot x^4 + \frac{2}{3} \cdot (x^2 \cdot y^3) + \frac{y^5}{3} \right) \quad (9)$$

and which are formed from a glass that together with the immersion medium meets the condition (7) and (8a) to (8c).

The achromatization condition also applies in an analogous manner in all other instances in which "any" wave front change $\Delta W(x,y)$ is generated at a base wavelength in that the freeform profile function $z(x, y)$ in the direction of the movement of the optical components to one another is designed proportional to the stem function of $\Lambda W(x,y)$ and vertically to the direction of movement proportional to the function $\Lambda W(x,y)$ itself.

Given a wave front manipulator which comprises an immersion medium between the optical components and given another selection of the optical media, a longitudinal color error cannot only be purposefully set to zero but the wave front manipulator can also be constructed in such a manner that defined amounts of longitudinal color errors are generated. Given a deviation from the condition according to equation (8a), equation (8b) or equation (8c), a lateral shifting of the optical components 21, 23 according to equation (2) generates at the same time a change of the power of refraction in the average wavelength (that is, a defocus) and, relative to it, a longitudinal color error for the edge wavelengths or secondary wavelengths. The greater the deviation of the condition according to equation (8a), equation (8b) or equation (8c) is, the more noticeable this effect becomes. It is particularly noticeable if equation (8a) is not met.

In individual cases such a superpositioning could be appropriate, for example, if the defocus in the average wavelength can be compensated by other optical means. However, in general it is desired to have a clear separation between a change of an average focus length and a change of the longitudinal color error. For this case the solution suggested here consists in using materials and media for the optical components 21, 23 and the immersion medium 22 arranged between the latter which almost do not differ from one another in the index of refraction n in the average wavelength but clearly differ from one another in the Abbe number v, in particular such materials and media in which the conditions $$|n_1 - n_2| \leq 0.0 \text{ and } j|v_1 - v_2| \geq 5 \quad (9a)$$

are simultaneously met. If the greater change of the longitudinal color error is desired without changing the focus length, this condition should be made sharper, namely, $$|n_1 - n_2| \leq 0.0: \text{ and } j|v_1 - v_2| \geq 10 \quad (9b)$$

or even and $$|n_1 - n_2| \leq 0.002 \text{ und } |v_1 - v_2| \geq 15 \quad (9c).$$

Suitable material combinations can be found and are even widely distributed since the dispersion of organic hydrocarbons in the case of typical refraction numbers for glass are throughout clearly higher than that of glass. For the case that the optical components 21, 23 are formed from plastic, for example, an aqueous (saline) solution doped with suitable alkali ions can be considered as immersion medium 22.

The conditions (9a) to (9c) can be understood from the following consideration: The more the Abbe number of the optical components 21, 23 differs from the Abbe number of the immersion medium 22, the smaller the lateral shifting paths can be – and the flatter the freeform surfaces 25, 27 of the optical components 21, 23 are for achieving a given longitudinal color error by the wave front manipulator. On the other hand: the less the index of refraction of the optical components 21, 23 differs from the index of refraction of the immersion medium 22, the smaller the change of the focus length in the average wavelength when adjusting a given longitudinal color error.

According to the construction principle expressed in the equations (8a) to (8c) a wave front manipulator for influencing the so-called Gauss error, that is, the image error which describes the chromatic variation of the spherical aberration can be made available, for example, with two optical components 21, 23 whose freeform surfaces are given by the equation (5).

As already mentioned, several structural profiles can be freely superposed in the freeform surfaces 25, 27 of the optical components 21, 23. For example, a structure for changing the power of refraction and a structure for changing the spherical aberration in the freeform surfaces 25, 27 can be superposed so that a corresponding variolens varies a refractive power effect upon the shifting of the optical components 21, 23 against one another, wherein both changes are proportional to one another with any proportionality factor that is, however, to be firmly preselected. Even in such more general applications the rules presented above can be appropriately used for the effect of an appropriate selection of material according to condition (8a), (8b) or (8c) or according to the conditions (9a), (9b) or (9c).

A wave front manipulator such as was described with reference made to FIG. 2 can replace in FIG. 1 the wave front manipulator described with reference made to FIG. 1.

Figure 3:
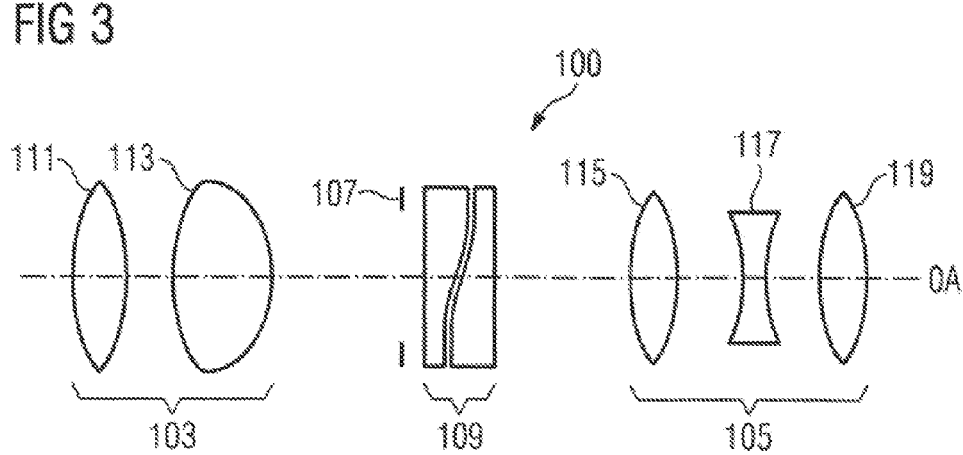
FIG. 3 shows an alternative embodiment for the lens of the present disclosure.

A second exemplary embodiment for the lens of the present disclosure is schematically shown in FIG. 3. The lens 100 of the second exemplary embodiment, that is constructed like the lens of the first exemplary embodiment as an adaptive lens, differs from the lens 1 of the first exemplary embodiment substantially in that the first lens unit 103 and the second lens unit 105 consist of a lens group. Another difference is that the aperture diaphragm 107 is placed in front of the wave front manipulator 109 toward the object-side first lens unit 103 instead of being placed after it toward the image-side lens unit 105. However, it is advantageous in the arrangement of the aperture diaphragm 107 shown in FIG. 3 if the diaphragm is arranged as close as possible to the wave front manipulator 109. The wave front manipulator 9 itself does not differ from the wave front manipulator 9 of the first exemplary embodiment. However, as in the first exemplary embodiment (and in all other exemplary embodiments) instead of the wave front manipulator shown a wave front manipulator can also be used as was described with reference made to FIG. 2, in particular when chromatic image errors are to be corrected.

In the objective 100 of the second exemplary embodiment the first lens unit 103 comprises at least two lenses 111, 113, wherein one of the lenses is constructed as an aspherical lens. In the present exemplary embodiment the lens 103 situated next to the wave front manipulator 109 is constructed as an aspherical lens.

The second lens unit 105 of the objective 100 of the second exemplary embodiment comprises three lenses 115, 117, 119 and is constructed as an afocal lens group, i.e., an incident collimated beam generates an emergent collimated beam, optionally with a different beam diameter. To this end the two outer lenses 115, 119 of the lens group 105 in the exemplary embodiment are constructed as positive lenses and the middle lens 117 as a negative lens. In distinction to the afocal, three-lens lens group shown in the exemplary embodiment the second lens unit 105 can also comprise more than three lenses. In particular, each of the three lenses 115, 117, 119 shown in FIG. 3 can be constructed as a lens group. However, there is also the possibility of constructing only one or two lenses of the lens group of the second lens element itself 105 shown in FIG. 3 from lens groups.

The design of the second lens unit 105 as an afocal lens group makes it possible to combine the objective 100 with other different optical units, especially with different microscope tubes.

It is pointed out that the lens groups 103 and 105 in FIG. 3 are shown in a greatly schematized manner and that the actual lens groups are as a rule more complex than as constructed in the schematic view of FIG. 3.

Figure 4:
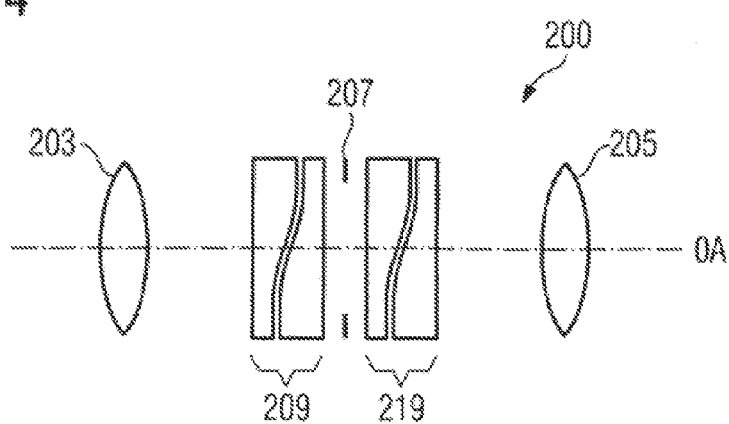
FIG. 4 shows another embodiment for the lens of the present disclosure.

A third exemplary embodiment for an objective in accordance with the present disclosure is shown in FIG. 4. The third exemplary embodiment of the objective 200, which is also constructed as an adaptive objective, differs from the first exemplary embodiment substantially in that two wave front manipulators 209, 219 are present. The first lens unit 203 and the second lens unit 205 are shown as individual lenses like in the first exemplary embodiment. However, there is also the possibility of realizing the first lens unit 203 and/or the second lens unit 205 as in the second exemplary embodiment in the form of a lens group or in the form of lens groups. It is noted here that there is basically the possibility even in the second exemplary embodiment of replacing one of the two lens groups 103, 105 by an individual lens.

In the objective 200 of the second exemplary embodiment the aperture diaphragm 207 is located between the two wave front manipulators 209, 219. However, it could also be arranged directly in front of the object-side wave front manipulator 209 or directly behind the image-side wave front manipulator 219. Two different image errors can be corrected independently of one another by induced, counteracting image errors with the aid of the two wave front manipulators. If the wave front manipulators 209, 219 are constructed as described referring to FIG. 1, two monochromatic image errors can be corrected and if they are constructed as described referring to FIG. 2, in addition the image errors can be achromatically corrected. There is basically also the possibility here of constructing one of the two wave front manipulators as shown in FIG. 1 and one of the two wave front manipulators as shown in FIG. 2. Furthermore, there is the possibility of arranging more than two wave front manipulators in the adaptive objective, as a result of which the number of correctable image errors is further increased. Each wave front manipulator can be constructed as designed as was described for FIG. 1 or as was described for FIG. 2.

The exemplary embodiment schematically shown in FIG. 4 makes possible two wave front manipulations that can be adjusted independently of one another. This can be used for the simultaneous compensation of the changes of two influencing magnitudes, e.g. for the compensation of a shifting of the object position, typically by ±200 µm (=±400 RE), and of a change of the index of refraction of an immersion medium used together with the objective. The index of refraction typically varies in a range from 1.30 to 1.38. The latter is the usual range in which the index of refraction of aqueous solutions can change in slightly different salt contents and temperatures. The changes of the two influencing magnitudes can be compensated independently of one another with the adjustable wave front manipulators 209, 219 from FIG. 4. In the case of a constant first influencing magnitude a compensating of a change of the second influencing magnitude alone is possible by adjusting the wave front manipulator associated with the second influencing magnitude and vice versa. The adjustment path in the wave front manipulator that is needed to compensate the one influencing magnitude depends on the value of the second influencing magnitude. Thus, e.g. the adjustment path for compensating a shifting of the object position depends on the value of the index of refractions and vice versa. In general, but in particular in the case of more than two influencing magnitudes to be compensated, a parametrical model can be set up which determines the necessary correcting variables on a calculating unit connected to the wave front manipulator or the wave front manipulators and outputs the determined correcting variables to the wave front manipulator or to the wave front manipulators. Alternatively, lookup tables can also be worked with that are filed in a control unit connected to the wave front manipulator or wave front manipulators. The lookup tables contain the required adjustment paths for compensating the change of the influencing magnitude or influencing magnitudes. The adjustment paths of the wave front manipulator or wave front manipulators needed for the compensation of the change of the influencing magnitude or influencing magnitudes can be determined in practice by an optimization calculation in an optical system design program or by calibration measurements, which supplies even more exact results than an optimization calculation.

Concrete exemplary embodiments for objectives in accordance with the present disclosure are described in the following. They are constructed as adaptive objectives.

A microscope with a high-aperture objective is described as a first concrete exemplary embodiment for an optical system with an objective in accordance with the present disclosure in the following using the FIGS. 5 to 12. The objective is an immersion objective designed according to the present disclosure with a numeric aperture of 1.0 for water immersion with as associated wave front manipulator designed for the refocusing in specimen depths of up to ±200 Rayleigh units (RE) in physiological common salt solution (typically for the index of refraction of cellular liquids). The refocusing range of ±200 RE within the specimen medium corresponds at an average reference wavelength of 546 nm to an adjustment range of ±100 µm. The objective has an object-side image field with a diameter of 1.0 mm. In addition, it has a correction which is continuously diffraction-limited over the entire adjustment range of ±200 RE.

The microscope of the first exemplary embodiment is schematically shown in FIG. 5. It comprises an objective 41 which consists of a plurality of objective lenses and converts the divergent beam emanating from an observation object 40 into a collimated beam and comprises a tubular lens system 43 which is arranged after the objective 41 and comprises two achromats. The collimated beam is focused into the image plane 45 by the tubular lens system 43.

The objective 41 comprises, viewed in the direction of the object 40 to the image, a first lens combination 47 that is called the front, positive lens group in the following and which has in its entirety such a positive power of refraction that it converts a divergent beam emanating from the observation object 40 into a collimated beam. The front, positive lens group 47 is followed by another lens group 49 with a positive power of refraction, called the middle positive lens group in the following, which re-converges the collimated beam emanating from the first positive lens group 47. The middle positive lens group 49 is followed by a concave lens 51 that converts the convergent beam emanating from the middle positive lens group into a divergent beam. The concave lens 51 is followed by yet another lens group 53 with a positive power of refraction, called the rear positive lens group in the following, which again generates a collimated bundle from the divergent bundle emanating from the concave lens 51. The rear positive lens group is the final lens group of the objective 41.

In the present first concrete exemplary embodiment the first lens combination 47 is telecentrically constructed on the object side, wherein its telecentricity error is 0.34°.

The following table 1 indicates how well the sinus condition was met in the present concrete exemplary embodiment for the front, positive lens group 47. $NAO=n_0 \cdot \sin \sigma_0$ is the numeric aperture in the object space, $\sigma_0$ the angle of ray inclination of the edge ray against the optical axis OA, $f_{FG}'=-n_0 \cdot f_{FG}$ is the front (object-side) focal length of the front lens group, $n_0$ is the index of refraction of the immersion medium between the object and the front lens, and $h_1$ is the level of incidence of the opening ray. As can be seen, the condition is approximately met. The deviations can also be partially explained in that the condition of a collimated beam path is not exactly maintained on the wave front manipulator. Taking this into consideration, the coincidence of $h_1$ and $f_{FG} \cdot \sin \sigma_0$ must be viewed as being very good and therefore significant.

TABLE 1

| NAO | $f'_{FG}$/mm | $f_{FG}$/mm | $\sigma_0$/degrees | $h_1$/mm | $f_{FG} \cdot \sin \sigma_0$ |
|---|---|---|---|---|---|
| 0.1 | 12.785 | 17.080 | 4.291 | 1.272 | 1.278 |
| 0.2 | 12.785 | 17.080 | 8.607 | 2.552 | 2.556 |
| 0.3 | 12.785 | 17.080 | 12.973 | 3.848 | 3.834 |
| 0.4 | 12.785 | 17.080 | 17.417 | 5.169 | 5.113 |
| 0.5 | 12.785 | 17.080 | 21.973 | 6.527 | 6.391 |
| 0.6 | 12.785 | 17.080 | 26.680 | 7.934 | 7.669 |
| 0.7 | 12.785 | 17.080 | 31.591 | 9.411 | 8.948 |
| 0.8 | 12.785 | 17.080 | 36.777 | 10.984 | 10.226 |
| 0.9 | 12.785 | 17.080 | 42.342 | 12.698 | 11.505 |
| 1.0 | 12.785 | 17.080 | 48.454 | 14.642 | 12.783 |

An air space with the collimated beam emanating from the front positive lens group 47 is present between the front positive lens group 47 and the middle positive lens group 49. A wave front manipulator 57 is arranged in this air space. This wave front manipulator comprises two optical components 59, 61 which are arranged so that they can shift vertically to the optical axis OA laterally and in opposite directions to one another. In the optical components 59, 61 of the wave front manipulator 57 the freeform profiles are designed in such a manner that a variation of the defocus takes place upon a shifting of the optical components 59, 61 in opposite directions vertically to the optical axis OA by the amount of the same shifting path. In addition, there is also a system pupil, that is, a real image of an aperture diaphragm in the area of the wave front manipulator.

The wave front manipulator 57 allows a lateral shifting of its optical components 59, 61 vertically to the optical axis by up to ±2.5 mm, wherein the movement of the two optical components 59, 61 always takes place exactly in opposite directions to one another so that the relative movement between the two optical components 59, 61 is up to 5 mm. The lateral shifting of the optical components 59, 61 by up to ±2.5 mm makes possible a variation of the intercept length of the object of up to ±100 μm. However, it is pointed out here that the variation of the intercept length of the object by ±100 μm does not represent a limit of what can be done but rather even distinctly greater effects of the wave front manipulator can be realized.

In the collimated beam between the front positive lens group 47 and the middle positive lens group 49 the angles of inclination of the edge rays relative to the optical axis OA are less than 2°. The angles of inclination of the edge rays vary between 1.65° and 1.05° over the adjustment range of the optical components of ±2.5 mm. For beams that are not axially parallel one half the angle between the coma rays (limitation rays of the beam) can be considered instead of the angle of inclination of the edge beams to the system axis.

The construction data of the microscope of FIG. 5 is shown in tabular form in FIG. 9, wherein the surfaces shown in FIG. 5 in the table are numbered throughout from left to right.

In addition to the wave front manipulator the objective comprises exclusively spherical lenses whose surface is described by the customary apex form of the spherical equation:

$$z = \frac{(x^2 + y^2)/R}{1 + \sqrt{1 - (1+k) \cdot \frac{(x^2 + y^2)}{R^2}}}.$$

The wave front manipulator comprises exactly two freeform surfaces whose shape is described in a general manner by a polynomial development according to equation (1). The polynomial coefficients of the two identical freeform surfaces (surface numbers 14 and 18 in FIG. 9) are:

| X2Y: −5.6320E−05 | Y3: −1.8852E−05 | X4Y: 1.4094E−08 |
| X2Y3: 9.3457E−09 | Y5: 2.7650E−09 | X6Y: 3.2102E−11 |
| X4Y3: 3.3091E−11 | X2Y5: 1.9355E−11 | Y7: 4.6200E−12 |

The refractive indices of the optical media in the wavelengths considered for the interpretation are:

| REFRACTIVE INDICES | | | | | | |
|---|---|---|---|---|---|---|
| GLASS CODE | 000.00 | 612.55 | 516.07 | 100.00 | 135.00 | 101.00 |
| NACL0923' | 1.329121 | 1.332099 | 1.335953 | 1.320964 | 1.341766 | 1.344111 |
| NK5_SCHOTT | 1.515478 | 1.520291 | 1.524583 | 1.529098 | 1.533470 | 1.537430 |
| SYCH51_OHARA | 1.743583 | 1.721310 | 1.750437 | 1.765079 | 1.773113 | 1.779702 |
| SFPL53_OHARA | 1.435018 | 1.437560 | 1.439854 | 1.442214 | 1.444472 | 1.446199 |
| NKZFS11_SCHOTT | 1.626065 | 1.633952 | 1.641325 | 1.649149 | 1.656571 | 1.664318 |
| SNBH53_OHARA | 1.721115 | 1.732356 | 1.743913 | 1.755560 | 1.767954 | 1.779800 |
| NLASF44_SCHOTT | 1.790816 | 1.799830 | 1.808316 | 1.017304 | 1.326133 | 1.634245 |
| NBK2_SCHOTT | 1.590950 | 1.604651 | 1.609937 | 1.615470 | 1.620616 | 1.625736 |
| NBALF4_SCHOTT | 1.550604 | 1.566230 | 1.571249 | 1.576493 | 1.581590 | 1.506255 |

-continued

REFRACTIVE INDICES

| GLASS CODE | 000.00 | 612.55 | 516.07 | 100.00 | 135.00 | 101.00 |
|---|---|---|---|---|---|---|
| N3T1_SCHOTT | 1.699812 | 1.711443 | 1.723077 | 1.776046 | 1.749488 | 1.762557 |
| SFTR16_OHARA | 1.580267 | 1.588563 | 1.596670 | 1.605592 | 1.614743 | 1.623555 |
| NBK7_SCHOTT | 1.510202 | 1.514719 | 1.118722 | 1.522829 | 1.526769 | 1.930324 |

The objective 41 with the optical components 59, 61 of the wave front manipulator 57 is shown in the FIGS. 6 to 8 in three different relative positions, wherein the relative position shown in FIG. 7 is the neutral position, in which the wave front manipulator 57 induces no defocus. In this position the average apex distance between the front lens and the object point is 2.0 mm, so that the objective has an object intercept length of 2.0 mm. The relative position of the optical components 59, 61 shown in FIG. 6 corresponds to an object intercept length reduced from 2.0 mm to 1.9 mm and the position shown in FIG. 8 corresponds to an object intercept length enlarged from 2.0 mm to 2.1 mm. Since the apex distance is in the medium "NaCl0923: (physiological saline solution), this selectively corresponds to a change of the focusing depth in the specimen (cell) or to a change of the thickness of the immersion film between the cover glass (consisting of NK5) and the apex of the object-side front lens of the front positive lens group 47.

The FIGS. 10 to 12 show the image errors occurring in the positions of the wave front manipulator 57 shown in FIGS. 6 to 8 for wavelengths in the range between 404 and 830 nm. The vertical axis designates the geometric-optical transverse aberration, wherein the scale extends from −0.5 mm to +0.5 mm. The left side, which is designated in the figure by y-fan shows the transverse aberration for a beam as a function of the y coordinate of the opening beam in the exit pupil and the right side, which is designated in the figure as x-fan, shows the corresponding view of the transverse aberration for the beam as a function of the x-coordinate of the opening beam in the exit pupil. The beam has an axial beam as the main beam here, i.e. the main beam is a beam which runs on the optical axis of the objective 41, and therefore has the x and y coordinates 0,0 and in the y-z plane as well as in the x-z plane the incident angle 0° relative to the optical axis. The image point of a beam characterized by an axial ray as the main ray, which image point is generated by the optical system in FIG. 5, is located here on the optical axis. In the FIGS. 10 to 12 FIG. 10 shows the image errors for the wave front manipulator position of FIG. 6, FIG. 11 shows the image errors for the wave front manipulator position from FIG. 7 and FIG. 12 shows the image errors for the wave front manipulator position from FIG. 8. A person skilled in the art readily recognizes that the objective 41 makes a practically diffraction-limited image available over the entire adjustment range of the wave front manipulator 57.

For the further illustration FIGS. 13 to 15 show which typical wave front errors would be produced on the other hand if an objective which was corrected comparably well had been used without the wave front manipulator 57 for the imaging with an object intercept length of ±100 μm that varies equally strongly and if a pure refocusing (compensation of the defocus but without compensation of the powers of spherical aberration being produced) had been carried out with the aid of the tubular lens distance.

In the following a microscope with a very high-aperture objective (NA=1.2) is described as a second concrete exemplary embodiment for an optical system with an objective in accordance with the present disclosure.

The objective of the microscope is an immersion objective designed in accordance with the present disclosure for immersion in water and with an object-side numeric aperture of NAO=1.2 with an associated wave front manipulator. The refocusing range inside the specimen medium is up to ±50 μm here, which corresponds at an average reference wavelength of 546 nm to an adjustment range of ±132 RE. The objective has an enlargement of 40 times and an objective-side image field with a 0.622 mm diameter and was corrected in a substantially diffraction-limited manner over the entire depth adjustment range.

The microscope of the second exemplary embodiment is schematically shown in FIG. 5. It comprises an objective 141 which consists of a plurality of objective lenses and which converts a divergent beam emanating from an observed object 140 into a collimated beam and comprises eight tubular lens system 143 arranged after the objective 141 which tubular lens system focuses the collimated beam in the image plane 145. In distinction to the tubular lens system 43 of the microscope in FIG. 5, the tubular lens system 143 in the present exemplary embodiment consists of only a single lens.

The objective 141 comprises, viewed in the direction from the object 140 to the image, a first lens combination 147 that is called in the following the front, positive lens group and which has on the whole such a positive power of refraction that it converts a divergent beam emanating from the observed object 140 into a collimated beam. The front positive lens group 147 is followed by another lens group 149 with a positive power of refraction, called the middle positive lens group in the following, which re-converges the collimated beam emanating from the first positive lens group 147. The middle positive lens group 149 is followed by a concave lens 151 that converts the convergent beam emanating from the middle positive lens group 149 into a divergent beam. The concave lens 151 is followed by yet another lens group 153 with a positive power of refraction, called the rear positive lens group in the following, which regenerates a collimated beam from the divergent beam emanating from the concave lens 151. The rear positive lens group is the final lens group of the objective 141.

In the present, second concrete exemplary embodiment the first lens combination 147 is telecentrically designed on the object side, wherein its telecentricity error is 0.77°.

The following table 2 indicates how well in the present concrete exemplary embodiment the sinus condition is met for the front positive lens group 47. $NAO = n_0 \cdot \sin \sigma_0$ is the numeric aperture in the object space, $\sigma_0$ the angle of ray inclination of the edge ray against the optical axis OA, $f_{FG} = -n_0 \cdot f'_{FG}$ is the front (object-side) focal length of the front lens group, $n_0$ is the index of refraction of the immersion medium between the object and the front lens, and $h_1$ is the level of incidence of the opening ray. As can be seen, the condition is approximately met. The deviations can also be partially explained in that the condition of a collimated beam path is not exactly maintained on the wave front manipulator. Taking this into consideration, the coincidence of $h_1$ and $f_{FG} \cdot \sin \sigma_0$ must be viewed as being very good and therefore significant.

TABLE 2

| NAO | $f_{FG}$/mm | $f_{FG}$/mm | $\sigma_{0\,degrees}$ | $h_1$/mm | $f_{FG} \cdot \sin \sigma_0$ |
|---|---|---|---|---|---|
| 0.1 | 6.870 | 9.165 | 4.298 | 0.673 | 0.687 |
| 0.2 | 6.870 | 9.165 | 8.621 | 1.348 | 1.374 |
| 0.3 | 6.870 | 9.165 | 12.994 | 2.026 | 2.061 |
| 0.4 | 6.870 | 9.165 | 17.446 | 2.711 | 2.748 |
| 0.5 | 6.870 | 9.165 | 22.009 | 3.403 | 3.435 |
| 0.6 | 6.870 | 9.165 | 26.725 | 4.105 | 4.122 |
| 0.7 | 6.870 | 9.165 | 31.646 | 4.822 | 4.809 |
| 0.8 | 6.870 | 9.165 | 36.842 | 5.559 | 5.496 |
| 0.9 | 6.870 | 9.165 | 42.421 | 6.323 | 6.183 |
| 1.0 | 6.870 | 9.165 | 48.549 | 7.127 | 6.870 |
| 1.1 | 6.870 | 9.165 | 55.535 | 7.994 | 7.557 |
| 1.2 | 6.870 | 9.165 | 63.554 | 8.915 | 8.206 |

An airspace with the collimated beam emanating from the front positive lens group 147 is present between the front positive lens group 147 and the middle positive lens group 149. A wave front manipulator 157 is located in this airspace. This manipulator comprises two optical components 159, 161 that are arranged vertically to the optical axis OA and can shift laterally and in opposite directions relative to one another. In the optical components 159, 161 of the wave front manipulator 157 the freeform profiles are designed in such a manner that in a shifting in opposite directions of the optical components 159, 161 vertically to the optical axis OA by the same amount of the shifting path a variation of the defocus takes place. In addition, another system pupil, that is, a real image of an aperture diaphragm is located in the area of the wave front manipulator 157.

The wave front manipulator 157 makes possible a lateral shifting of the optical components 159, 161 vertically to the optical axis by up to ±2.0 mm, wherein the movement of the two optical components 159, 161 always takes place exactly in opposite directions to one another so that the relative movement between the two optical components 159, 161 is up to 4 mm. The lateral shifting of the optical components 159, 161 by up to ±2.0 mm makes possible a variation of the object intercept length of up to ±50 μm around the average object intercept length. However, it is also pointed out here that the variation of the object intercept length by ±50 μm does not impose any limit on that which can be done but rather even clearly greater effects of the wave front manipulator can be realized.

In the collimated beam between the front positive lens group 147 and the middle positive lens group 149 the angles of inclination of the edge rays relative to the optical axis OA are less than 2°. The angles of inclination of the edge rays over the adjustment range of the optical condensers of ±2.0 mm vary between 0.20° and 1.31°. For non-axially parallel beams one half of the angle between the coma rays (limitation rays of the beam) can be considered instead of the inclination angle of the edge rays to the system axis.

The construction data of the microscope of FIG. 16 is shown in tabular form in FIG. 9, wherein the surfaces shown in FIG. 16 are numbered throughout from left to right in the table.

The objective of the microscope also comprises, in addition to the wave front manipulator and spherical lenses, two aspherical surfaces which are described by the customary apex form of a rotational asphere:

$$z = \frac{(x^2 + y^2)/R}{1 + \sqrt{1 - (1+k) \cdot \frac{(x^2 + y^2)}{R^2}}} +$$

$$A \cdot (x^2 + y^2)^2 + B \cdot (x^2 + y^2)^3 + C \cdot (x^2 + y^2)^4 + D \cdot (x^2 + y^2)^5.$$

The two aspherical surfaces (surfaces 3 and 4 in the table of FIG. 20) have the following aspherical coefficients:

Surface 3:

| | |
|---|---|
| A = −0.156746E−01 | B = −0.119916E+00 |
| C = 0.215754E+00 | D = −0.204669E+00 |

Surface 4:

| | |
|---|---|
| A = 0.127444E−02 | B = 0.404391E−04 |
| C = 0.137145E−04 | D = −0.103400E−05 |

The wave front manipulator comprises exactly two freeform surfaces whose shape is generally described by a polynomial development according to equation (1). The polynomial coefficients of the two identical freeform surfaces (surface numbers 14 and 18 in FIG. 20) are:

| | | |
|---|---|---|
| X2Y: −1.2659E−04 | Y3: −4.2124E−05 | X4Y: −1.5024E−07 |
| X2Y3: −9.7060E−08 | Y5: −2.4566E−08 | X6Y: −9.8928E−10 |
| X4Y3: −8.7122E−10 | X2Y5: −5.4991E−10 | Y7: −1.4515E−10 |

The indices of refraction of the optical media in the wavelengths considered for the interpretation are:

| GLASS CODE | 850.00 | 643.85 | 546.07 | 479.99 | 435.83 | 404.00 | 365.00 |
|---|---|---|---|---|---|---|---|
| 'W23' | 1.326855 | 1.331188 | 1.334190 | 1.337167 | 1.339939 | 1.342540 | 1.346757 |
| K5_SCHOTT | 1.515107 | 1.520241 | 1.524583 | 1.529099 | 1.533376 | 1.537439 | 1.544127 |
| SLAH58_OHARA | 1.865804 | 1.877573 | 1.888146 | 1.899492 | 1.910498 | 1.921170 | 1.939182 |
| SFPL53_OHARA | 1.434820 | 1.437560 | 1.439854 | 1.442215 | 1.444424 | 1.448499 | 1.449862 |
| NKZFS2_SCHOTT | 1.549486 | 1.555701 | 1.560824 | 1.566120 | 1.571136 | 1.575915 | 1.581828 |
| NLASF44_SCHOTT | 1.790134 | 1.799830 | 1.808316 | 1.817305 | 1.825940 | 1.834245 | 1.848126 |
| NKZFS11_SCHOTT | 1.625462 | 1.633952 | 1.641325 | 1.649150 | 1.656705 | 1.664018 | 1.676362 |
| SNBH53_OHARA | 1.720293 | 1.732356 | 1.743413 | 1.755563 | 1.767681 | 1.779800 | 1.801257 |
| NKZFS4_SCHOTT | 1.602051 | 1.609874 | 1.616639 | 1.623803 | 1.630709 | 1.637388 | 1.648656 |
| SNBH52_OHARA | 1.659038 | 1.668601 | 1.677185 | 1.686467 | 1.695574 | 1.704528 | 1.719980 |
| SYGH51_OHARA | 1.742985 | 1.751319 | 1.758437 | 1.765881 | 1.772957 | 1.779701 | 1.790832 |
| NBALF4_SCHOTT | 1.570691 | 1.576827 | 1.582122 | 1.587690 | 1.593010 | 1.598106 | 1.606583 |
| NBK7_SCHOTT | 1.509840 | 1.514719 | 1.518722 | 1.522829 | 1.526685 | 1.530324 | 1.536270 |

In the FIGS. 17 to 19 the objective 141 is shown with the optical components 159, 161 of the wave front manipulator 157 in three different relative positions, wherein the relative position shown in FIG. 18 is the neutral position in which the wave front manipulator 157 does not induce any defocus. The relative position of the optical components 159, 161 shown in FIG. 17 corresponds to a reduction of the object intercept length by 50 µm and the position shown in FIG. 19 corresponds to an enlargement of the object intercept length by 50 µm.

The FIGS. 21 to 23 show the image errors occurring in the positions of the wave front manipulator 57 shown in the FIGS. 17 to 19 for wavelengths in the range between 365 and 850 nm. As in the FIGS. 10 to 12, the vertical axis designates the geometric-optical transverse aberration, wherein the scale extends from −0.5 mm to +0.5 mm. The left side, that is designated the Y fan in the figure, shows the transverse aberration for a beam as a function of the Y coordinate of the opening ray in the exit pupil and the right side, that is designated the X fan in the figure shows a corresponding view of the transverse aberration for the beam as a function of the X coordinate of the opening ray in the exit pupil. The beam has an axial ray as the main ray, i.e., the main ray is a ray that runs on the optical axis of the objective 141, that is, has the X- and Y coordinates 0,0 and has the incident angle 0° in the −Y-Z plane and in the X-Z plane relative to the optical axis. The image point of a beam characterized by an axial ray as the main ray, which image point is generated by the optical system in FIG. 16, lies on the optical axis in the FIGS. 21 to 23 FIG. 21 shows the image errors for the solution formulation position in FIG. 17, FIG. 22 shows the image errors for the wave front manipulator position in FIG. 18, and FIG. 23 shows the image errors for the wave front manipulator position in FIG. 19. A person skilled in the art readily recognizes that the objective 141 makes a practically diffraction-limited image available over the entire adjustment range of the wave front manipulator 157.

The present disclosure was explained in detail using exemplary embodiments for purposes of illustration. However, the present disclosure is not limited to the exemplary embodiment shown but rather features of the individual exemplary embodiments can also be combined with each other in as far as the features do not contradict each other. In addition, modifications can be made to the individual exemplary embodiments. Therefore, the present disclosure should be limited solely by the attached claims. Examples of possible deviations from the exemplary embodiments are shown in the following:

In the described exemplary embodiments the opposing shifting of the optical components of the wave front manipulator in the Y direction corresponds in the figures to a shifting vertical to the optical axis OA within the plane of the drawings. However, this is not obligatory. The direction of the opposing shifting can have any desired orientation in a plane vertical to the optical axis. If, for example, a movement in the X direction instead of in the Y direction were to be selected, then the powers of X and Y would have to be correspondingly exchanged with one another in the description of the freeform surface. In any position of the shifting axis relative to the system coordinate system formally completely different coefficients would result for the completely congruent freeform surface so that the coefficients are always to be viewed in combination with the selected coordinate system.

The microscopes described in the concrete exemplary embodiments were used together with an immersion medium present between the object and the objective, which medium had a clearly higher index of refraction than air and therefore made possible high numeric aperture of the objective. Current immersion media have indices of refraction between 1.3 and 2.1. They frequently have an index of refraction in the range of approximately 1.3 to 1.5. The value of the index of refraction can fluctuate e.g. due to temperature influences by up to 5% and more. However, an objective according to the present disclosure can also be used in microscopes without immersion medium or in other optical observation devices, for example in endoscopes.

Wave front manipulators were used in the exemplary embodiments as pupil filters. However, instead of a wave front manipulator or in addition to a wave front manipulator at least one other pupil filter can also be used. Examples for suitable pupil filters are phase masks, for example annular phase plates like those used to carry out the Zernike phase contrast method known to a person skilled in the art. Other examples for suitable pupil filters are apodization filters, spectral filters or spatial light modulators (SLM). The objective in accordance with the present disclosure is therefore advantageous in that it makes plausible a quasi-modular construction in combination with one or more pupil filters.

The invention claimed is:

1. An objective for a microscope with a first lens unit, at least one second lens unit and a real pupil, wherein:
   the first lens unit and the second lens unit are arranged at a distance from each other along an optical axis of the objective so that an intermediate space is present between the first lens unit and the second lens unit, and the second lens unit is arranged on an image side relative to the first lens unit;
   the first lens unit is constructed in such a manner that it generates a collimated beam;
   the real pupil is located in the intermediate space between the first lens unit and the second lens unit, wherein the first lens unit meets at least the condition $$\left| \frac{h_1 - f_{FG} \cdot \sin\sigma_0}{h_1} \right| < 0.3$$

for a pupil range present between 0% and 100% of a pupil radius, wherein
   h1 designates a level of incidence of an opening ray at a location of the real pupil,
   σ0 designates an angle of an inclination of a beam of an edge beam opposite the optical axis,
   fFG designates an object-side focal length of the first lens unit in air.

2. The objective according to claim 1 in which the first lens unit meets at least the condition:

$$\left| \frac{h_1 - f_{FG} \cdot \sin\sigma_0}{h_1} \right| \leq 0.15$$

for the range located between 0 and 71% of the pupil radius.

3. The objective according to claim 2, in which the first lens unit comprises an aspherical lens.

4. The objective according to claim 1, in which the first lens unit comprises an aspherical lens.

5. The objective according to claim 1, in which the first lens unit is telecentrically constructed on the object side.

6. The objective according to claim 1, in which at least one pupil filter is arranged between the first lens unit and the second lens unit.

7. The objective according to claim 6, in which at least one wave front manipulator is arranged in the intermediate space between the first lens unit and the second lens unit as a pupil filter, and the wave front manipulator comprises a first optical component with at least one refractive freeform surface or with a diffractive surface and comprises at least one second optical component with at least one refractive freeform surface or with a diffractive surface, wherein the first optical component and the second optical component are arranged successively along the optical axis and can be moved relative to one another in a direction of movement vertical to the optical axis.

8. The objective according to claim 7, in which an immersion medium contacting the two components is present between the first optical component and the second optical component of the wave front manipulator.

9. The objective according to claim 8, in which the immersion medium is a fluid or an elastic optokit.

10. The objective according to claim 8, in which the immersion medium has a dispersion course deviating from the normal straight line.

11. The objective according to claim 8, in which material of the first optical component and of the second optical component of a wave front manipulator has a dispersion course deviating from the normal straight line.

12. The objective according to claim 7, in which the real pupil is located between the first optical component and the second optical component of the wave front manipulator.

13. The objective according to claim 6, in which at least one of the following optical elements is arranged in the intermediate space between the first lens unit and the second lens unit as a pupil filter: an apodization filter, a spectral filter or a spatial modulator for light.

14. The objective according to claim 6, in which at least one second pupil filter is arranged between the first lens unit and the second lens unit.

15. The objective according to claim 1, in which the second lens unit is afocally constructed.

16. The objective according to claim 1, which has a numeric aperture of at least 0.8.

17. The objective according to claim 16, which is constructed as a microscope objective for cooperating with an immersion medium bordering on the object side on the first lens unit.

18. An optical observation device with an objective according to claim 1.

19. The optical observation device according to claim 18, which furthermore comprises at least one third lens unit which is arranged on the image side of the objective and generates a real intermediate image together with the objective.

20. The optical observation device according to claim 19, in which the third lens unit is a tubular lens group.

* * * * *